United States Patent
Wei et al.

(10) Patent No.: US 11,736,408 B2
(45) Date of Patent: Aug. 22, 2023

(54) SCHEDULING METHOD APPLIED IN INDUSTRIAL HETEROGENEOUS NETWORK IN WHICH TSN AND NON-TSN ARE INTERCONNECTED

(71) Applicant: CHONGQING UNIVERSITY OF POSTS AND TELECOMMUNICATIONS, Chongqing (CN)

(72) Inventors: Min Wei, Chongqing (CN); XueQin Xiang, Chongqing (CN); Ping Wang, Chongqing (CN); XianChun Yan, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 137 days.

(21) Appl. No.: 17/423,484

(22) PCT Filed: Jul. 15, 2020

(86) PCT No.: PCT/CN2020/102199
§ 371 (c)(1),
(2) Date: Jul. 16, 2021

(87) PCT Pub. No.: WO2021/227245
PCT Pub. Date: Nov. 18, 2021

(65) Prior Publication Data
US 2022/0353195 A1 Nov. 3, 2022

(30) Foreign Application Priority Data
May 11, 2020 (CN) .......................... 202010400917.6

(51) Int. Cl.
*H04L 47/52* (2022.01)
*H04L 41/0896* (2022.01)
(Continued)

(52) U.S. Cl.
CPC ........ *H04L 47/522* (2013.01); *H04L 41/0896* (2013.01); *H04L 45/14* (2013.01); *H04L 47/2458* (2013.01); *H04L 47/56* (2013.01)

(58) Field of Classification Search
CPC . H04L 41/0803; H04L 41/0896; H04L 41/12; H04L 41/122; H04L 43/0876;
(Continued)

(56) References Cited

U.S. PATENT DOCUMENTS

2018/0176308 A1* 6/2018 Tsai ..................... H04L 45/306
2019/0253339 A1* 8/2019 Mehmedagic ........ H04L 45/123
(Continued)

FOREIGN PATENT DOCUMENTS

| CN | 105897493 A | 8/2016 |
| CN | 107294746 A | 10/2017 |

(Continued)

OTHER PUBLICATIONS

International Search Report for PCT/CN2020/102199 dated Feb. 9, 2021, ISA/CN.

*Primary Examiner* — Pao Sinkantarakorn
(74) *Attorney, Agent, or Firm* — Yue (Robert) Xu; Apex Attorneys at Law, LLP

(57) ABSTRACT

A scheduling method applied in an industrial heterogeneous network in which a TSN and a non-TSN are interconnected is provided. The TSSDN controller classifies data flows according to the delay requirements, and calculates the scheduling priorities of the data flows in the industrial heterogeneous network. The TSSDN controller adopts an improved CSPF algorithm to determine a shortest path in the (Continued)

heterogeneous network, and marks the scheduling priorities of the data flows which are transmitted from the subnet of the heterogeneous network and arrive at the switch for the first time. Flow table matching is performed at the SDN switch. In a case of performing flow table matching successfully, the counter is updated and the instruction included in the flow table is executed. In a case of performing flow table matching unsuccessfully, a PacketIn message is transmitted to the TSSDN controller, and the TSSDN controller performs analysis and makes a decision.

8 Claims, 8 Drawing Sheets

(51) Int. Cl.
*H04L 45/00* (2022.01)
*H04L 47/24* (2022.01)
*H04L 47/56* (2022.01)

(58) Field of Classification Search
CPC ..... H04L 43/20; H04L 45/14; H04L 47/2458; H04L 47/522
See application file for complete search history.

(56) References Cited

U.S. PATENT DOCUMENTS

| | | | | |
|---|---|---|---|---|
| 2020/0351752 | A1* | 11/2020 | Ivas | H04W 40/246 |
| 2021/0029029 | A1* | 1/2021 | Mehmedagic | H04L 41/40 |
| 2021/0092153 | A1 | 3/2021 | Wei et al. | |
| 2022/0078076 | A1* | 3/2022 | Chen | H04L 41/042 |

FOREIGN PATENT DOCUMENTS

| | | |
|---|---|---|
| CN | 108289104 A | 7/2018 |
| CN | 108809707 A | 11/2018 |
| CN | 108965171 A | 12/2018 |
| CN | 109450943 A | 3/2019 |
| CN | 110996368 A | 4/2020 |
| WO | 2009026012 A1 | 2/2009 |

* cited by examiner ated scheduling method applied in industrial heterogeneous network in which TSN and non-TSN are interconnected This application is the national phase of International Application No. PCT/CN2020/102199, titled "SCHEDULING METHOD APPLIED IN INDUSTRIAL HETEROGENEOUS NETWORK IN WHICH TSN AND NON-TSN ARE INTERCONNECTED", filed on Jul. 15, 2020, which claims priority to Chinese Patent Application No. 202010400917.6, titled "SCHEDULING METHOD APPLIED IN INDUSTRIAL HETEROGENEOUS NETWORK IN WHICH TSN AND NON-TSN ARE INTERCONNECTED", filed on May 11, 2020 with the Chinese Patent Office, which are incorporated herein by reference in their entireties.

FIELD

The present disclosure relates to the field of industrial Ethernet, and in particular to a scheduling method applied in an industrial heterogeneous network in which a TSN and a non-TSN are interconnected.

BACKGROUND

Industrial Ethernet is widely used in mission-critical industrial applications, automotive control, and other applications. However, with the changes in requirements of factory businesses, technologies such as big data and cloud computing are applied to the industrial control, IT and OT are integrated, it is required not only to transmit big data, but also to ensure that the transmission is real-time and accurate, thus the conventional industrial Ethernet protocol cannot meet the requirement. Moreover, in a case that a large amount of different types of data are included in a network, how to perform reasonable scheduling to ensure QoS of data transmission is a problem to be solved urgently.

Due to the problems existed in the industrial Ethernet, a TSN network is provided. TSN (time sensitive networking) is a set of "substandards" determined according to a specific application requirement and based on the IEEE802.1 standard. With the TSN, a "universal" time-sensitive mechanism is established for the Ethernet protocol to ensure that network data is transmitted in real time, accurately and with low latency. For the TSN, it is important to transmit data in a "same" network, that is, transmit data in a heterogeneous network.

However, the solution for how to perform a high-efficiency and high-quality scheduling in a heterogeneous network to transmit different types of data accurately and with a low delay in the network is not provided according to the conventional TSN scheduling mechanism.

SUMMARY

In view of this, a scheduling method applied in an industrial heterogeneous network in which a TSN and a non-TSN are interconnected is provided according to the embodiments of the present disclosure.

To achieve the above object, following technical solutions are provided according to the present disclosure.

A scheduling method applied in an industrial heterogeneous network in which a TSN and a non-TSN are interconnected is provided. The industrial heterogeneous network based on time sensitive software defined networking (TSSDN) includes an application plane, a control plane, and a forwarding plane. The application plane includes a user and a terminal installed with an application program for controlling a TSSDN controller, where the application program installed in the terminal is used by the user to configure the TSSDN controller according to an application requirement of the user. The control plane includes the TSSDN controller, where the TSSDN controller identifies a network topology, determines a scheduling strategy, performs path management, and the TSSDN controller schedules a data flow in the industrial heterogeneous network based on an application request from an application layer. The forwarding plane includes an industrial network and a TSN network. The industrial network includes at least one network based on an industrial network protocol of EtherCAT, Profinet, or powerlink. The industrial heterogeneous network includes a non-TSN industrial network, a TSN industrial network, and a TSN industrial network cross a non-TSN network, which are classified according to whether the data flow in the industrial heterogeneous network is a TSN data flow. The forwarding plane includes an SDN switch, a TSN switch, an industrial switch, an industrial field device, and a TSN field device. The SDN switch, the TSN switch and industrial switch perform data forwarding. The industrial field device transmits and receives data in the industrial network. The TSN field device includes a TSN talker and a TSN listener. The TSN talker transmits data, and TSN listener receives data.

Further, the TSSDN controller is a core of the industrial heterogeneous network and has a function of performing centralized management and control. The TSSDN controller includes a path management module, a topology management module, and a strategy management module. The TSSDN controller schedules the data flow in the industrial heterogeneous network based on the application request from the application layer. The topology management module identifies the network topology, updates the network topology, and feeds the network topology back to the application program installed in the terminal. Thus, the user may obtain the topology of industrial heterogeneous network with the application program in the terminal. The path management module performs multiple path management operations including setting a link delay and setting a queue bandwidth, in response to the application requirement of the user. The strategy management module includes a TSN module and an SDN module, and performs strategy management to meet a delay requirement of a time sensitive application in the industrial heterogeneous network. A CUC/CNC in the TSN module performs centralized management on the data in the TSN industrial network. The CNC performs a centralized calculation, including calculating transmission scheduling, determining a data path, and scheduling the TSN data flow based on a time-aware shaper and a frame preemption scheduling algorithm. An SDN controller in the SDN module performs centralized management on the non-TSN industrial network and the TSN industrial network cross a non-TSN network, and schedules the non-TSN industrial network and the TSN industrial network cross a non-TSN network by transmitting a flow table to the SDN switch.

Further, the method includes the following steps:

step S1: configuring and managing, by the user, the TSSDN controller according to the application requirement by using the application program installed in the terminal in a network deployment phase;

step S2: classifying, by the TSSDN controller, data according to a delay requirement;

step S3: managing, by the TSSDN controller, a scheduling priority of the data;

step S4: calculating, by the TSSDN controller, a shortest path;

step S5: marking the scheduling priority;

step S6: performing flow table matching at the SDN switch, where the SDN switch includes one or more flow tables, the flow table matching is started from a first flow table in the flow tables in sequence; in a case that data is matched with a flow entry in a flow table, a counter is updated and an instruction included in the flow table is executed, where the instruction includes a forwarding instruction or a discarding instruction; and in a case that the flow table matching is performed unsuccessfully, a PacketIn message is transmitted to the TSSDN controller, and the TSSDN controller performs analysis and makes a decision;

step S7: determining whether a queue congestion occurs, where a current network environment may deteriorate due to an increase in the amount of data in forwarding data, serious packet loss may occur if the amount of data to be forwarded is not adjusted in time, and some important and time-sensitive data may be lost and cannot be transmitted to certain receiving terminals, thus queues at a port are monitored in real time based on a feedback adjustment mechanism according to the present disclosure, and when a network congestion occurs, adjustment is performed based on the network congestion to prevent data retention caused by a queue congestion, and different adjustments are performed for different levels of network congestion to avoid malicious packet loss in forwarding data, and the level of the queue congestion is determined based on a queuing delay according to the present disclosure;

step S8: performing adjustment based on a queue congestion feedback, where when the queue congestion occurs, a bandwidth of the queue is adjusted based on the level of the queue congestion, the level of the queue congestion is determined based on the queuing delay, and based on traffic, the level of the queue congestion is determined as a normal state, a general congestion state, or a severe congestion state, the queuing delay is compared with a maximum queue bandwidth, it is determined that the queue is in the normal state in a case that the queuing delay is less than 70% of the maximum queue bandwidth, it is determined that the queue is in the severe congestion state in a case that the queuing delay is greater than 90% of the maximum queue bandwidth, and it is determined that the queue is in the general congestion state in a case that the queuing delay is between 70% of the maximum queue bandwidth and 90% of the maximum queue bandwidth.

Further, in step S1, the user performs topology information management and flow information management according to the application requirement of the user by using the application program installed in the terminal. The flow information management includes setting the link delay, setting the maximum queue bandwidth and a minimum queue bandwidth, and determining current data forwarding in the network. The user configures the link delay and a link bandwidth according to the application requirement. After the user performs the configuration successfully, six sets are generated. The six sets include a link set, a delay requirement set for each of links, a jitter requirement set for each of the links, a bandwidth set for each of the links, a path constraint set determined by the user, and a bandwidth set for each of queues:

a link set $\{L_1 \ldots L_i \ldots\}$;
a delay requirement set for each of links $\{d_1 \ldots d_i \ldots\}$;
a jitter requirement set for each of the links $\{j_1 \ldots j_i \ldots\}$;
a bandwidth set for each of the links $\{BD_1 \ldots BD_i \ldots\}$;
a path constraint set determined by the user $\{d_c, j_c, BD_c\}$; and
a maximum bandwidth and minimum bandwidth set for a queue k $\{max\_bw\_k, min\_bw\_k\}$.

Further, in step S2, it is assumed that Path(p,q) represents a path from node p to node q, a link $L_1$ in the network meets an expression of $L_i \in Path(p,q)$, $d_i$, $j_i$, and $BD_i$ respectively represent a delay, a jitter and a bandwidth of the link i, dl represents a delay level, OP represents a priority of data in the TSN network, a represents a ratio of dl to a scheduling priority reference coefficient $\Theta_i$, and β represent a ratio of OP to the scheduling priority reference coefficient $\Theta_i$. The TSSDN controller classifies links into the following three types according to distributions of TSN nodes and non-TSN nodes: links between the TSN nodes and the TSN nodes, included in a set S1{TSN←→TSN}; links between the TSN nodes and the non-TSN nodes, included in a set S2{TSN←→non-TSN}; and links between the non-TSN nodes and the non-TSN nodes, included in a set S3{TSN←→non-TSN}. For S1{TSN←→TSN}, data flows are classified according to IEEE 802.1Q into eight types: a background data flow, a best effort data flow, an excellent effort data flow, a critical application data flow, a video data flow, a voice data flow, an internet control data flow, and a network control data flow. For S2{TSN←→non-TSN} and S3{non-TSN←→non-TSN}, the TSSDN controller classifies data flows in the industrial heterogeneous network according to the delay requirements of the links by performing comparison and calculation based on the following inequalities (1), (2), and (3):

$$d_i \geq 100 \text{ ms} \tag{1}$$

$$1 \text{ ms} < d_i < 100 \text{ ms} \tag{2}$$

$$di < 1 \text{ ms} \tag{3}$$

A data flow having a delay requirement meeting inequality (1) is determined as non-real-time (NRT) data, a data flow having a delay requirement meeting inequality (2) is determined as real-time (RT) data, a data flow having a delay requirement meeting inequality (3) is determined as time-critical (TC) data, and a data flow having no delay requirement is determined as a best-effort (BE) data flow. Thus, for S2{TSN←→non-TSN}, data flows are classified into four types: time-critical data, real-time data, non-real-time data, and a best-effort data flow, which are respectively represented by $TC_{cross}$, $RT_{cross}$, $NRT_{cross}$, and $BE_{cross}$. For S3{non-TSN←→non-TSN}, data flows are classified into four types: time-critical data, real-time data, non-real-time data, and a best-effort data flow, which are respectively represented by $TC_{non}$, $RT_{non}$, $NRT_{non}$, and $BE_{non}$. The industrial heterogeneous network based on TSSDN includes multiple links, the links are classified into three sets S1{TSN←→TSN}, S2{TSN←→non-TSN}, and S3{non-TSN←→non-TSN} based on the distributions of the TSN nodes and the non-TSN nodes. For each of the three sets, data flows are further classified into multiple types according to the delay requirements. The classification of the data flows are shown in the following table 1.

TABLE 1

Classification of data flows in industrial heterogeneous network

| Links | S1{TSN ←→ TSN} | S2{TSN ←→ non-TSN} | S3{non-TSN ←→ non-TSN} |
|---|---|---|---|
| $L_{TSN1-1}, L_{TSN1-2} \ldots L_{TSN1-a}$ | Background data flow | | |
| $L_{TSN0-1}, L_{TSN0-2} \ldots L_{TSN0-b}$ | Best effort data flow | | |
| $L_{TSN2-1}, L_{TSN2-2} \ldots L_{TSN2-c}$ | Excellent effort data flow | | |
| $L_{TSN3-1}, L_{TSN3-2} \ldots L_{TSN3-d}$ | Critical application data flow | | |
| $L_{TSN4-1}, L_{TSN4-2} \ldots L_{TSN4-e}$ | Video data flow | | |
| $L_{TSN5-1}, L_{TSN5-2} \ldots L_{TSN5-f}$ | Voice data flow | | |
| $L_{TSN6-1}, L_{TSN6-2} \ldots L_{TSN6-g}$ | Internet control data flow | | |
| $L_{TSN7-1}, L_{TSN7-2} \ldots L_{TSN7-h}$ | Network control data flow | | |
| $L_{crossBE1}, L_{crossBE2} \ldots L_{crossBE\ a'}$ | | $BE_{cross}$ | |
| $L_{crossNRT1}, L_{crossNRT2} \ldots L_{crossNRT\ b'}$ | | $NRT_{cross}$ | |
| $L_{crossRT1}, L_{crossRT2} \ldots L_{crossRT\ c'}$ | | $RT_{cross}$ | |
| $L_{crossTC1}, L_{crossTC2} \ldots L_{crossTC\ d'}$ | | $TC_{cross}$ | |
| $L_{nonBE1}, L_{nonBE2} \ldots L_{nonBE\ a''}$ | | | $BE_{non}$ |
| $L_{nonNRT1}, L_{nonNRT2} \ldots L_{nonNRT\ b''}$ | | | $NRT_{non}$ |
| $L_{nonRT1}, L_{nonRT2} \ldots L_{nonRT\ c''}$ | | | $RT_{non}$ |
| $L_{nonTC1}, L_{nonTC2} \ldots L_{nonTC\ d''}$ | | | $TC_{non}$ |

Further, in step S3, the data flows in S1{TSN←→TSN} are scheduled and managed by the TSN module in the TSSDN controller, and priorities of the data flows are determined according to IEEE802.1Q. A priority of the TSN data flow is indicated in a PCP field according to IEEE802.1Q. The TSN data flow has eight priorities: 0, 1, 2, 3, 4, 5, 6, and 7. OP represents a priority of a data flow in the S1{TSN←→TSN}. For the S2{TSN←→non-TSN} and S3{TSN←→non-TSN}, delay level dl is used, that is, four delay levels are determined according to the delay requirements, and the delay levels correspond to data types one to one. Delay levels of TSN←→non-TSN links and non-TSN←→non-TSN links are represented by dl. A delay level dl of the best effort data flow is 1, a delay level dl of the non-real-time data is 2, a delay level dl of the real-time data is 3, and a delay level dl of the time-critical data is 4.

TABLE 2

Original priority and delay level in industrial heterogeneous network based on TSSDN

| Links | S1{TSN ←→ TSN} | S2{TSN ←→ non-TSN} | S3{non-TSN ←→ non-TSN} | OP | $dl_i$ |
|---|---|---|---|---|---|
| $L_{TSN1-1}, L_{TSN1-2} \ldots L_{TSN1-a}$ | Background data flow | | | 1 | |
| $L_{TSN0-1}, L_{TSN0-2} \ldots L_{TSN0-b}$ | Best effort data flow | | | 0 | |
| $L_{TSN2-1}, L_{TSN2-2} \ldots L_{TSN2-c}$ | Excellent effort data flow | | | 2 | |
| $L_{TSN3-1}, L_{TSN3-2} \ldots L_{TSN3-d}$ | Critical application data flow | | | 3 | |
| $L_{TSN4-1}, L_{TSN4-2} \ldots L_{TSN4-e}$ | Video data flow | | | 4 | |
| $L_{TSN5-1}, L_{TSN5-2} \ldots L_{TSN5-f}$ | Voice data flow | | | 5 | |
| $L_{TSN6-1}, L_{TSN6-2} \ldots L_{TSN6-g}$ | Internet control data flow | | | 6 | |
| $L_{TSN7-1}, L_{TSN7-2} \ldots L_{TSN7-h}$ | Network control data flow | | | 7 | |
| $L_{crossBE1}, L_{crossBE2} \ldots L_{crossBE\ a'}$ | | $BE_{cross}$ | | | 1 |
| $L_{crossNRT1}, L_{crossNRT2} \ldots L_{crossNRT\ b'}$ | | $NRT_{cross}$ | | | 2 |
| $L_{crossRT1}, L_{crossRT2} \ldots L_{crossRT\ c'}$ | | $RT_{cross}$ | | | 3 |
| $L_{crossTC1}, L_{crossTC2} \ldots L_{crossTC\ d'}$ | | $TC_{cross}$ | | | 4 |
| $L_{nonBE1}, L_{nonBE2} \ldots L_{nonBE\ a''}$ | | | $BE_{non}$ | | 1 |
| $L_{nonNRT1}, L_{nonNRT2} \ldots L_{nonNRT\ b''}$ | | | $NRT_{non}$ | | 2 |
| $L_{nonRT1}, L_{nonRT2} \ldots L_{nonRT\ c''}$ | | | $RT_{non}$ | | 3 |
| $L_{nonTC1}, L_{nonTC2} \ldots L_{nonTC\ d''}$ | | | $TC_{non}$ | | 4 |

Assuming that a scheduling priority reference coefficient $\Theta_i$ of a link i is expressed as the following equations:

$$\Theta_i = \begin{cases} \alpha * dl + \beta & Li \in S2\{TSN \leftarrow \rightarrow nonTSN\} \quad (4) \\ \alpha * dl & Li \in S3\{nonTSN \leftarrow \rightarrow nonTSN\} \quad (5) \end{cases}$$

where $\alpha$ represents a ration of dl to the scheduling priority reference coefficient $\Theta_i$, $\beta$ represent a ratio of OP to the scheduling priority reference coefficient $\Theta_i$, and $\alpha+\beta=1$. The TSSDN controller does not calculate scheduling priority reference coefficients of the data flows in the S1{TSN←→TSN}, calculates scheduling priority reference coefficients of the data flows in the S2{TSN←→non-TSN} based on equation (4), and calculates scheduling priority reference coefficients of the data flows in the S3{non-TSN←→non-TSN} based on equation (5). $\alpha$ and $\beta$ may be adjusted according to low-latency requirements and real-time requirements for data in different application environments. In the present disclosure, requirements for low latency and accuracy of data are considered, it is assumed $\alpha$ is equal to 0.4 and $\beta$ is equal to 0.6, the scheduling priority of the heterogeneous network is shown in the following table 3, in which a lowest priority is 1 and a highest priority is 6.

TABLE 3

Relationship between scheduling priority reference coefficient and scheduling priority

| $\Theta i$ | Scheduling priority SP |
|---|---|
| 0 < $\Theta i$ <= 0.5 | 1 |
| 0.5 < $\Theta i$ <= 1.0 | 2 |
| 1 < $\Theta i$ <= 1.3 | 3 |
| 1.3 < $\Theta i$ <= 1.6 | 4 |
| 1.6 < $\Theta i$ <= 1.9 | 5 |
| $\Theta i$ > 1.9 | 6 |

The priorities of the data flows in the S1{TSN←→TSN} are determined according to IEEE802.1Q, scheduling priorities of the data flows in the S2{TSN←→non-TSN} and S3{non-TSN←→non-TSN} are related to scheduling priority reference coefficients. The types and scheduling priorities of data flows in the industrial heterogeneous network based on TSSDN are shown in the following table 4.

TABLE 4

| | Scheduling priority | | | | | | |
|---|---|---|---|---|---|---|---|
| Link L | S1{TSN ←→ TSN} | S2{TSN←→ non-TSN} | S3{non-TSN←→ non-TSN} | OP | dl | $\Theta_i$ | SP |
| $L_{TSN1-1}, L_{TSN1-2} \cdots L_{TSN1-a}$ | Background data flow | | | 1 | | | 1 |
| $L_{TSN0-1}, L_{TSN0-2} \cdots L_{TSN0-b}$ | Best effort data flow | | | 0 | | | 0 |
| $L_{TSN2-1}, L_{TSN2-2} \cdots L_{TSN2-c}$ | Excellent effort data flow | | | 2 | | | 2 |
| $L_{TSN3-1}, L_{TSN3-2} \cdots L_{TSN3-d}$ | Critical application data flow | | | 3 | | | 3 |
| $L_{TSN4-1}, L_{TSN4-2} \cdots L_{TSN4-e}$ | Video data flow | | | 4 | | | 4 |
| $L_{TSN5-1}, L_{TSN5-2} \cdots L_{TSN5-f}$ | Voice data flow | | | 5 | | | 5 |
| $L_{TSN6-1}, L_{TSN6-2} \cdots L_{TSN6-g}$ | Internet control data flow | | | 6 | | | 6 |
| $L_{TSN7-1}, L_{TSN7-2} \cdots L_{TSN7-h}$ | Network control data flow | | | 7 | | | 7 |
| $L_{crossBE1}, L_{crossBE2} \cdots L_{crossBE\ a'}$ | | $BE_{cross}$ | | 1 | 1 | | 2 |
| $L_{crossNRT1}, L_{crossNRT2} \cdots L_{crossNRTb'}$ | | $NRT_{cross}$ | | 2 | 1.4 | | 4 |
| $L_{crossRT1}, L_{crossRT2} \cdots L_{crossRT\ c'}$ | | $RT_{cross}$ | | 3 | 1.8 | | 5 |
| $L_{crossTC1}, L_{crossTC2} \cdots L_{crossTCd'}$ | | $TC_{cross}$ | | 4 | 2.2 | | 6 |
| $L_{nonBE1}, L_{nonBE2} \cdots L_{nonBE\ a''}$ | | | $BE_{non}$ | 1 | 0.4 | | 1 |
| $L_{nonNRT1}, L_{nonNRT2} \cdots L_{nonNRT\ b''}$ | | | $NRT_{non}$ | 2 | 0.8 | | 2 |
| $L_{nonRT1}, L_{nonRT2} \cdots L_{nonRT\ c''}$ | | | $RT_{non}$ | 3 | 1.2 | | 3 |
| $L_{nonTC1}, L_{nonTC2} \cdots L_{nonTC\ d''}$ | | | $TC_{non}$ | 4 | 1.6 | | 4 |

Further, in step S4, after the TSSDN controller calculates a scheduling priority SP of a data flow, it is required to determine a path for the data flow. In selecting a route in a network, a Dijkstra algorithm may be used for selecting a route in a case of only considering the number of hops of the route. However, as the scale of the network continuously increases, more metric factors, such as constraints on bandwidth, delay, jitter, and packet loss rate, are required to be considered in selecting a route in a network. CSPF algorithm is a Dijkstra algorithm with constraints. In the present disclosure, an improved CSPF algorithm, that is, a multi-constrained and multi-objective routing algorithm is used to select an optimal path in the network to ensure efficient use of network resources under multiple constraints. With the multi-constrained and multi-objective routing algorithm, an optimal path meeting multiple constraints is determined for a data flow in the network based on a network state and an application requirement. According to the present disclosure, the multiple constraints include bandwidth, delay, and jitter, and a route having a smallest delay and a largest available bandwidth is determined. It is assumed that Path (p,q) represents the path from node p to node q, a link $L_i$ in the network meets $L_i \in Path(p,q)$, $d_i$, $j_i$, and $BD_i$ respectively represent the delay, jitter, and bandwidth of the link i. In a case that there is only one path from node p to node q, the only one path is a shortest path. In a case that there are multiple paths from node p to node q, a shortest path is calculated with the method according to the present disclosure. Constraint attributes of the path are expressed as the following equations:

$$d(Path(p,q)) = \Sigma_{L_i \in Path(p,q)} d_i \quad (6)$$

$$j(Path(p,q)) = \Sigma_{L_i \in Path(p,q)} j_i \quad (7)$$

$$BD(Path(p,q)) = \min\{BD_i, L_i \in Path(p,q)\} \quad (8)$$

where d(Path(p,q)) represents a sum of delays of the path Path(p,q), j(Path(p,q)) represents a sum of jitters of the path Path(p,q), and BD(Path(p, q)) represents a minimum bandwidth of the path Path (p, q). The multi-constrained and multi-objective routing algorithm according to the present disclosure is a multi-objective routing algorithm with a delay, a jitter and a bandwidth as constraints and with a minimum delay and a maximum available bandwidth as objectives, and is expressed as the following equation and inequalities:

$$\begin{cases} f(x) = (f1(x), f2(x)) \\ d(Path(p, q)) \le dc \\ j(Path(p, q)) \le jc \\ BD(Path(p, q)) \ge BDc \end{cases} \quad (9)$$

where an objective function F(x) is further expressed as:

$$\begin{cases} f1(x) = \min\{d(Path(p, q))\} \\ f2(x) = \max\{AvailableBD(Path(p, q))\} \end{cases} \quad (10)$$

where dc, jc, and BDc respectively represent a path delay constraint value, a path jitter constraint value, and a path bandwidth constraint value which are pre-determined by the user; min{D(Path(p,q))} represents a minimum delay from node p to node q, and max{AvailableBD(Path(p,q))} represents a maximum available bandwidth from node p to node q. In the multi-constrained and multi-objective routing algorithm, a target route is determined based on a dictionary sorting algorithm. The dictionary sorting algorithm is an analytical algorithm for solving a multi-objective optimization problem, and a core idea of the dictionary sorting algorithm is that an importance of an objective function is indicated by a ranking of the objective functions. According to the algorithm in the present disclosure, the objective function f1(x) is ranked before f2(x), that is, a minimum delay is a primary objective in calculating a path, and if there are multiple paths having the minimum delay, a path having a largest available bandwidth is selected.

Further, in step S5, to meet the qualities of service of data flows having different scheduling priorities, in the present disclosure, the TSSDN controller determines scheduling priorities of data flows from different field devices according. Eight scheduling priorities correspond to eight queues one to one, as shown in the following table 5:

TABLE 5

| Mapping of scheduling priorities and queues | |
|---|---|
| Scheduling priority SP | Queue |
| 0 | 0 |
| 1 | 1 |
| 2 | 2 |
| 3 | 3 |
| 4 | 4 |
| 5 | 5 |
| 6 | 6 |
| 7 | 7 |

Each of data packets is scheduled based on a scheduling priority label of the data packet to control the data packet to arrive at the SDN switch in sequence. In a case that congestion occurs in the industrial heterogeneous network based on TSSDN due to that data flows having a scheduling priority increase suddenly, the TSSDN controller obtains network topology information, centrally controls the SDN switches to forward data flows in the industrial heterogeneous network, and transmits flow tables to perform bandwidth allocation and congestion control on data flows containing a large amount of data to improve network service quality. In a case that a data flow of a subnet of the heterogeneous network based on TSSDN arrives at a switch for a first time, the data flow is packaged as a PacketIn message and then is transmitted to the TSSDN controller due to that the switch does not includes a flow entry matching the data flow. The TSSDN controller calculates a scheduling priority SP of the data flow with the method according to the present disclosure, and maps the scheduling priority SP to a priority code point (PCP). The TSSDN controller transmit a flow entry of "marking a scheduling priority and forwarding to a destination port" to the switch. Then, for each of data flows arriving at the switch, a PCP field of the data flow is marked with a scheduling priority, and the data flow is forwarded to an outgoing port corresponding to the destination port.

Further, in step S6, to improve accuracy of the TSSDN controller identifying the TSN data flow, the conventional flow table is modified according to the present disclosure, a matching field is extended, thus the SDN switch may match the TSN data packet accurately based on the extended matching field. Protocol type is added in the matching field, where the protocol type indicates a network protocol, such as 802.1AS, 802.1Qbu, and 802.1Qbv, in the TSN network. Source MAC address is added in the matching field, where the source MAC address indicates a MAC address of a source of the TSN data. Destination MAC address is added in the matching field, where the destination MAC address indicates a MAC address of a destination of the TSN data. to improve accuracy of the TSSDN controller identifying the TSN data flow, the conventional flow table is modified according to the present disclosure, a matching field is extended, thus the SDN switch may match the TSN data packet accurately based on the extended matching field. Protocol type is added in the matching field, where the protocol type indicates a network protocol, such as 802.1AS, 802.1Qbu, and 802.1Qbv, in the TSN network. Source MAC address is added in the matching field, where the source MAC address indicates a MAC address of a source of the TSN data. Destination MAC address is added in the matching field, where the destination MAC address indicates a MAC address of a destination of the TSN data. When a data flow arrives at the SDN switch, the SDN switch encapsulates data in the data flow as a PacketIn message and transmits the PacketIn message to the TSSDN controller. Based on a VLAN, a source MAC address and a destination MAC address in a matching field, the TSSDN controller transmits a TSN data flow to the TSN module and the TSN module schedules and manages the TSN data flow, and the TSSDN controller transmits a non-TSN data flow and a data flow of a TSN network cross a non-TSN network to a SDN module and the SDN module schedules and manages the non-TSN data flow and the data flow of the TSN network cross a non-TSN network. After the TSSDN controller performing a scheduling algorithm based on network traffic, the TSSDN controller determines to forward or discard a data flow based on a scheduling priority and bandwidth of the data flow arriving at the SDN switch, and transmits a flow table to the SDN switch. The SDN switch performs operations based on a matching result of the flow table in response to the decision of the TSSDN controller.

Further, in step S7, to accurately obtain a current network congestion, a random early detection (RED) algorithm is used to calculate an average length of a queue. $avgQ\_k$ represents an average length of a queue $k$. $q\_k$ represents a real-time length of the queue $k$ and is calculated based on an enqueue rate and a dequeue rate of the queue $k$. $w$ represents a weight, which is a time constant. Then, the average length of the queue is expressed as the following equation:

$$avgQk=(1-w)*avgQk+q*w \qquad (7)$$

$$q\_k=\text{in\_rate}-\text{out\_rate} \qquad (8)$$

In the random early detection algorithm, it is important to set a reasonable weight. Using a suitable w, the average queue length of the queue can be balanced, and the problem of average queue length jitter caused by a data surge or a short-term queue congestion can be avoided. With a too large w, the short-term queue congestion cannot be filtered out. With a too small w, the congestion cannot be reasonably reflected.

To calculate the queuing delay, it is required to obtain a current rate of the queue. The user sets a maximum bandwidth and a minimum bandwidth for each of the queues by using the application program in the terminal. If the maximum bandwidth is not equal to the minimum bandwidth, data is to be transmitted within a predetermined rate range; and if the maximum bandwidth is set equal to the minimum bandwidth, data in the queue is to be transmitted at a rate close to a predetermined rate. Thus, the current rate of the queue is obtained. The queuing delay is calculated based on the following equation:

$$\text{que\_dealy}\_k=avgQk/\text{now\_rate}\_k \qquad (9)$$

where que_dealy_k represents a delay of the queue k, and now_rate_k represents a current rate of the queue k, that is, a current bandwidth of the queue.

Further, in step S8, when the queue congestion occurs, the bandwidth of the queue is adjusted to a certain level based on the queue congestion. It is important to determine a level of a congestion in optimizing data forwarding. The level of the queue congestion is determined based on the queuing delay. Based on the data flows, the level of the queue congestion is determined as the normal state, the general congestion state, or the severe congestion state, as shown in the following table 6:

| Relationship between queuing delay and maximum bandwidth | Congestion level |
| --- | --- |
| que_dealy < 70% max_bd | Normal state |
| 70% < que_dealy < 90% max_bd | General congestion state |
| que_dealy > 90% max_bd | Severe congestion state |

The queuing delay is compared with the maximum queue bandwidth, it is determined that the queue is in the normal state in a case that the queuing delay is less than 70% of the maximum queue bandwidth, it is determined that the queue is in the severe congestion state in a case that the queuing delay is greater than 90% of the maximum queue bandwidth, and it is determined that the queue is in the general congestion state in a case that the queuing delay is between 70% of the maximum queue bandwidth and 90% of the maximum queue bandwidth. Based on a feedback adjustment mechanism, the queue bandwidth is adjusted based on a current priority and congestion of the queue. In a case of eight queues, a queue having a higher priority indicates that the queue has a stronger ability to preempt bandwidths of other queues in adjusting bandwidth, and a queue having a lower priority indicates that bandwidth of the queue is easier to be preempted and the queue has a worse ability to ensure QoS of a network. A queue preempts bandwidth according to the following two rules: rule (1), ensuring that a queue having a lower priority is not to enter into the severe congestion state in a case that a queue having a higher priority preempts bandwidth of the queue having the lower priority, and ensuring that a queue having a higher priority is in the normal state in a case that a queue having a lower priority preempts bandwidth of the queue having the higher priority, and rule (2), following a higher-first-lower-later rule in a case that queues having different priorities simultaneously preempt a bandwidth, that is, the queue having the higher priority preempts first, and then the queue having the lower priority preempts. Based on the rule (2), data having a high priority is to be transmitted first to ensure the time sensitivity of the data.

According to the present disclosure, following benefit effects can be achieved. A high-efficiency and high-quality scheduling is performed in the industrial heterogeneous network in which a TSN and a non-TSN are interconnected to transmit different types of data accurately and with a low delay in the network.

Other advantages, objects and features of the present disclosure are described in the following description to a certain extent. And to a certain extent, investigation and research based on the following description are apparent for those skilled in the art, or those skilled in the art may learn from the practice of the present disclosure. The objects and other advantages of the present disclosure can be realized and obtained from the following description.

BRIEF DESCRIPTION OF THE DRAWINGS

Hereinafter, the present disclosure is described in detail with reference to drawings to further explain objects, technical solutions, and advantages of the present disclosure. In the drawings.

DETAILED DESCRIPTION OF THE EMBODIMENTS

Figure 1:
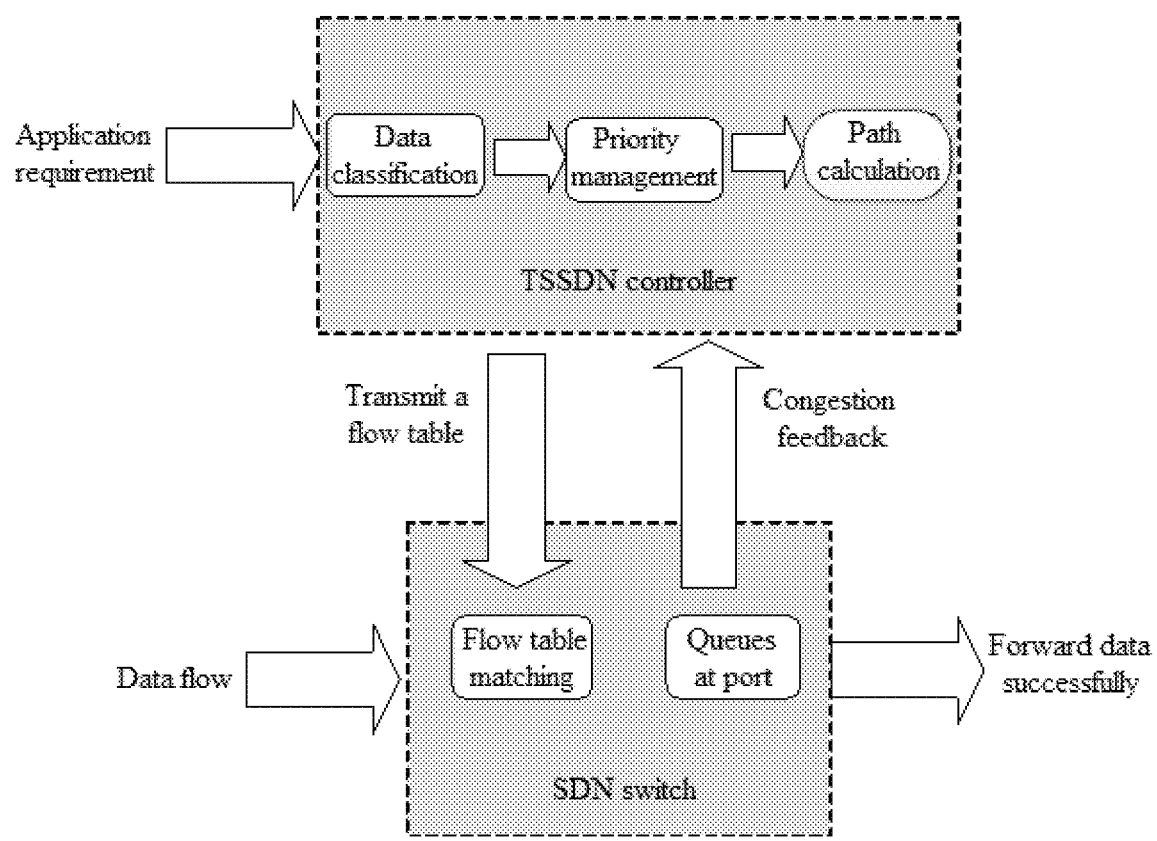
FIG. 1 is a flow chart of a scheduling method applied in an industrial heterogeneous network in which a TSN and a non-TSN are interconnected according to an embodiment of the present disclosure.
Figure 2:
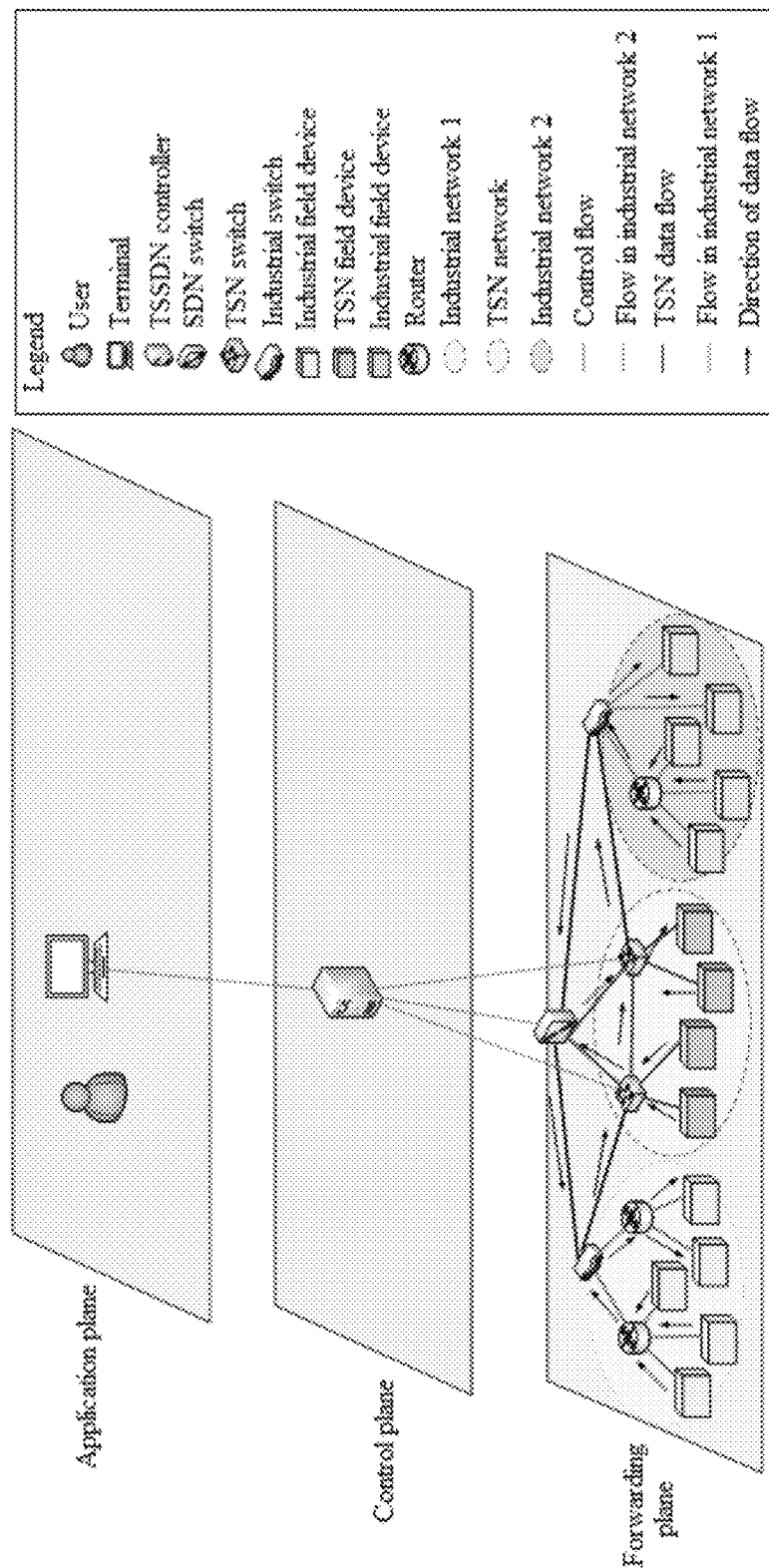
FIG. 2 is a schematic structural diagram of an industrial heterogeneous network based on TSSDN.
Figure 3:
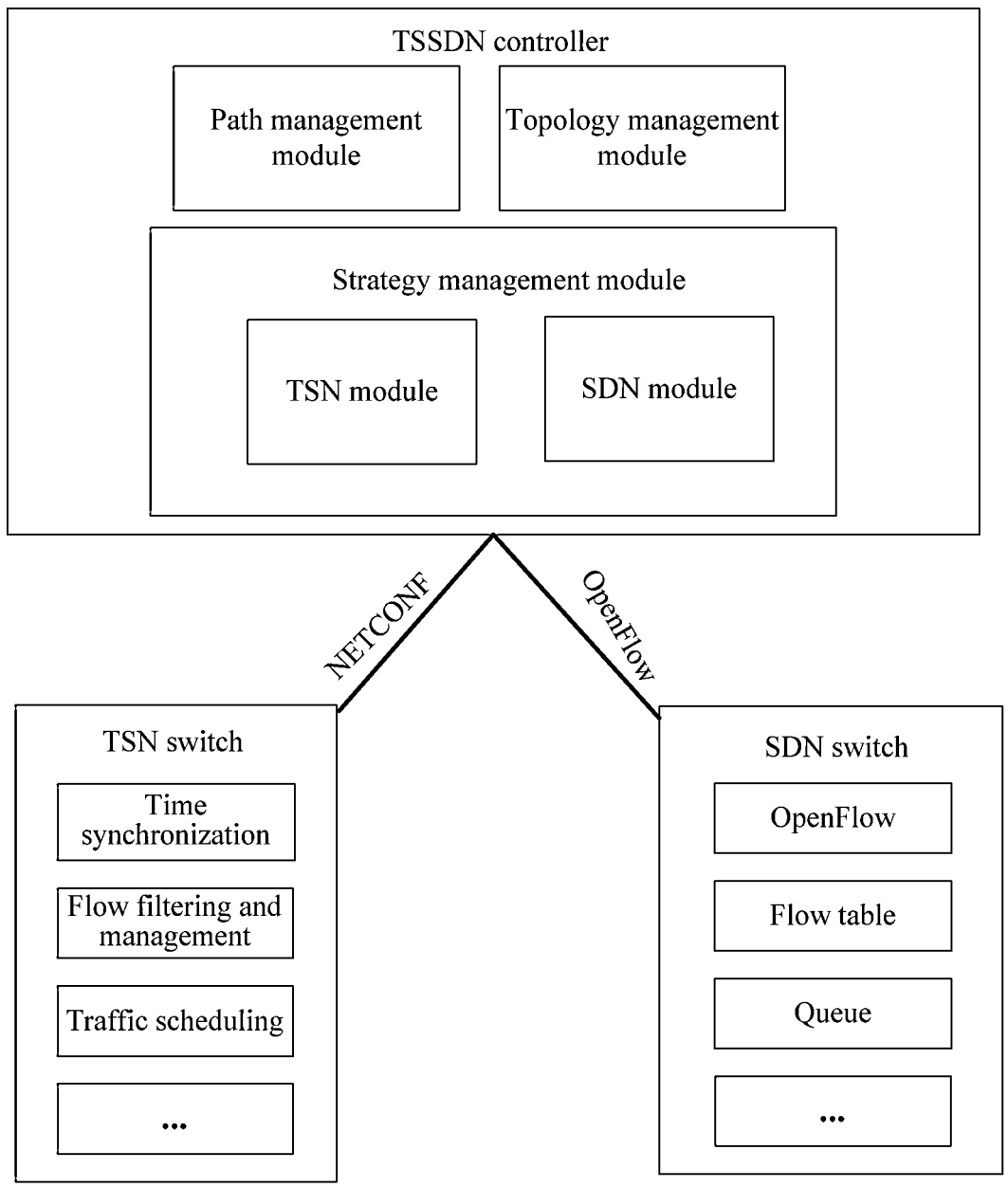
FIG. 3 is a schematic structural diagram of a TSSDN controller.
Figure 4:
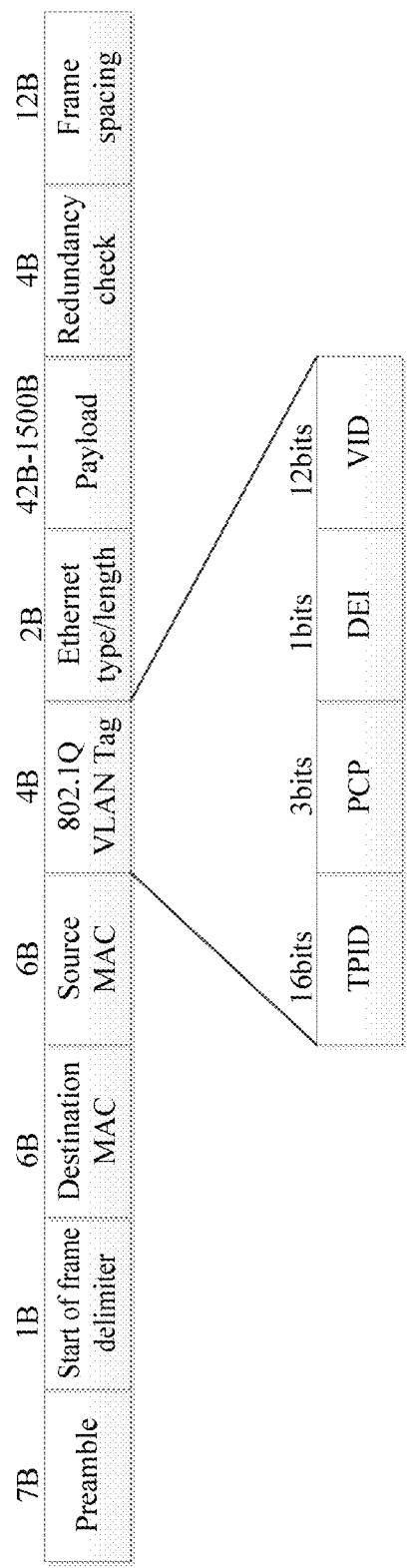
FIG. 4 is a schematic diagram of an Ethernet frame having a VLAN tag.
Figure 5:
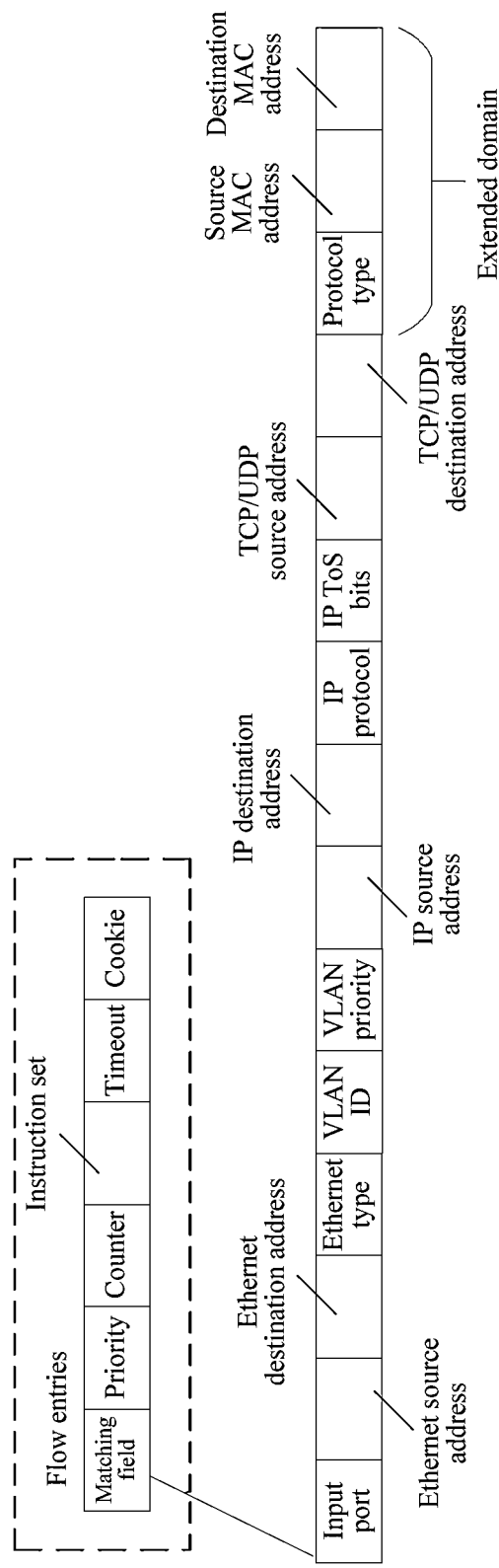
FIG. 5 is a schematic diagram of an extended matching field.
Figure 6:
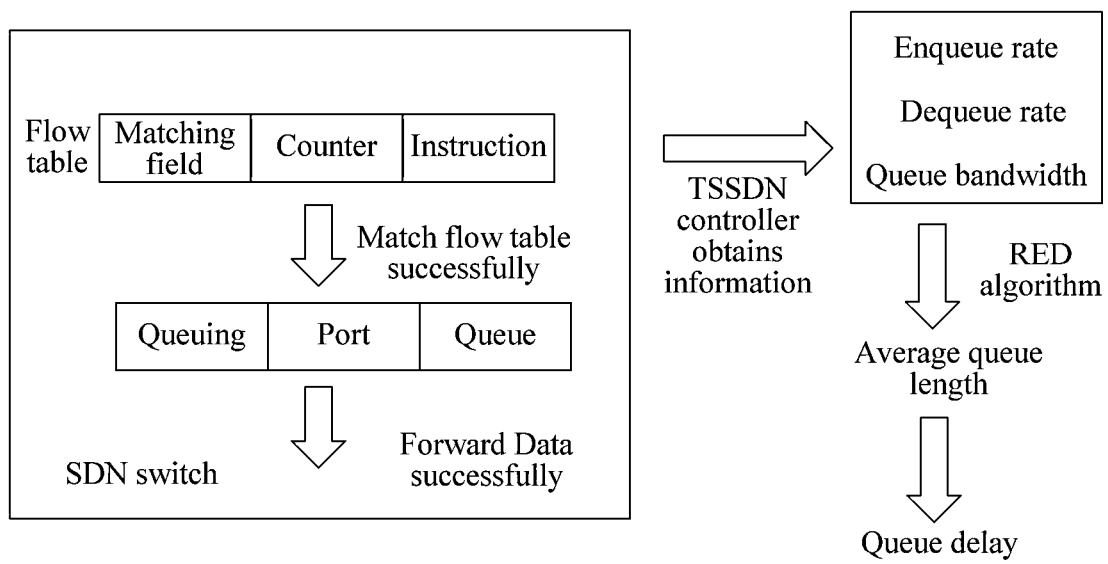
FIG. 6 is a flow chart of calculating a queuing delay.

The embodiments of the present disclosure are illustrated with specific examples. Those skilled in the art can easily understand other advantages and effects of the present disclosure from the content disclosed in this specification. The present disclosure may be implemented or applied in other different embodiments. Various details in this specification may be modified or changed according to different viewpoints and applications without departing from the spirit of the present disclosure. It should be noted that the drawings in the following embodiments are only used to illustrate the basic concept of the present disclosure. In the case of no conflict, the following embodiments and the features in the embodiments can be combined if no conflict is caused.

The drawings are only used for exemplary description, and are only schematic diagrams rather than physical diagrams, and should not be understood as a limitation of the present disclosure. In order to better illustrate the embodiments of the present disclosure, some components in the drawings may be omitted, enlarged or reduced, and do not represent the size of an actual product. It should be understood by those skilled in the art that some well-known structures and descriptions of the structures may be omitted in the drawings.

The same or similar reference numerals in the drawings of the embodiments of the present disclosure indicate the same or similar components. It should be understood that in the description of the present disclosure, orientations or position relationships, indicated by terms "upper", "lower", "left", "right", "front", "rear", and the like, are orientations or positional relationships shown in the drawings. These terms are used for the convenience of describing the present disclosure and simplifying the description, rather than indicating or implying that devices or elements indicated by the terms must have a specific orientation, or be constructed and operated in a specific orientation. Therefore, the terms describing the position relationship in the drawings are only used for exemplary description, and should not be understood as a limitation of the present disclosure. Those skilled in the art may understand the meanings of the terms in a certain condition.

As shown in FIG. 1, a scheduling method applied in an industrial heterogeneous network in which a TSN and a non-TSN are interconnected is provided according to the present disclosure. The method includes the following eight steps.

In a first step, a user configure a TSSDN controller according to an application requirement by using an application program installed in a terminal in a network deployment phase.

The user performs topology information management and flow information management according to the application requirement of the user by using the application program installed in the terminal. The flow information management includes setting a link delay, setting a maximum queue bandwidth and a minimum queue bandwidth, and determining current data forwarding in the network. The user configures the link delay and the link bandwidth according to the application requirement. After the user performs configuration successfully, six sets are generated, including a link set, a delay requirement set for each of links, a jitter requirement set for each of the links, a bandwidth set for each of the links, a path constraint set determined by the user, and a bandwidth set for each of queues as show in the following:

a link set $\{L_1 \ldots L_i \ldots\}$;

a delay requirement set for each of links $\{d_1 \ldots d_i \ldots\}$;

a jitter requirement set for each of the links $\{j_1 \ldots j_i \ldots\}$;

a bandwidth set for each of the links $\{BD_1 \ldots BD_i \ldots\}$;

a path constraint set determined by the user $\{d_c, j_c, BD_c\}$; and a maximum bandwidth and minimum bandwidth set for a queue k $\{max\_bw\_k, min\_bw\_k\}$.

In a second step, the TSSDN controller classifies data according to a delay requirement.

It is assumed that Path(p,q) represents a path from node p to node q, a link $L_i$ in the network meets $L_i \in Path(p,q)$, $d_i$, $j_i$, and $BD_i$ respectively represent a delay, a jitter and a bandwidth of the link i, dl represents a delay level, OP represents a priority of data in the TSN network, a represents a ratio of dl to a scheduling priority reference coefficient $\Theta_i$, and β represent a ratio of OP to the scheduling priority reference coefficient $\Theta_i$. The TSSDN controller classifies links into the following three types according to distributions of TSN nodes and non-TSN nodes:

links between the TSN nodes and the TSN nodes, included in a set S1{TSN←→TSN};

links between the TSN nodes and the non-TSN nodes, included in a set S2{TSN←→non-TSN}; and links between the non-TSN nodes and the non-TSN nodes, included in a set S3{TSN←→non-TSN}.

For S1{TSN←→TSN}, data flows are classified according to IEEE 802.1Q into eight types: a background data flow, a best effort data flow, an excellent effort data flow, a critical application data flow, a video data flow, a voice data flow, an internet control data flow, and a network control data flow.

For S2{TSN←→non-TSN} and S3{non-TSN←→non-TSN}, the TSSDN controller classifies data flows in the industrial heterogeneous network according to the delay requirements of the links by performing comparison and calculation based on the following inequalities (1), (2), and (3):

$$d_i \geq 100 \text{ ms} \quad (1)$$

$$1 \text{ ms} < d_i < 100 \text{ ms} \quad (2)$$

$$di < 1 \text{ ms} \quad (3)$$

A data flow having a delay requirement meeting inequality (1) is determined as non-real-time (NRT) data, a data flow having a delay requirement meeting inequality (2) is determined as real-time (RT) data, a data flow having a delay requirement meeting inequality (3) is determined as time-critical (TC) data, and a data flow having no delay requirement is determined as a best-effort (BE) data flow.

Thus, for S2{TSN←→non-TSN}, data flows are classified into four types: time-critical data, real-time data, non-real-time data, and a best-effort data flow, which are respectively represented by $TC_{cross}$, $RT_{cross}$, $NRT_{cross}$, and $BE_{cross}$.

For S3{non-TSN←→non-TSN}, data flows are classified into four types: time-critical data, real-time data, non-real-time data, and a best-effort data flow, which are respectively represented by $TC_{non}$, $RT_{non}$, $NRT_{non}$, and $BE_{non}$.

The industrial heterogeneous network based on TSSDN includes multiple links, the links are classified into three sets S1{TSN←→TSN}, S2{TSN←→non-TSN}, and S3{non-TSN←→non-TSN} based on the distributions of the TSN nodes and the non-TSN nodes. For each of the three sets, data flows are further classified into multiple types according to the delay requirements. The classification of the data flows are shown in the following table 1.

TABLE 1

Classification of data flows in industrial heterogeneous network

| Links | S1{TSN←→TSN} | S2{TSN←→non-TSN} | S3{non-TSN←→non-TSN} |
|---|---|---|---|
| $L_{TSN1-1}, L_{TSN1-2} \ldots L_{TSN1-a}$ | Background data flow | | |
| $L_{TSN0-1}, L_{TSN0-2} \ldots L_{TSN0-b}$ | Best effort data flow | | |
| $L_{TSN2-1}, L_{TSN2-2} \ldots L_{TSN2-c}$ | Excellent effort data flow | | |
| $L_{TSN3-1}, L_{TSN3-2} \ldots L_{TSN3-d}$ | Critical application data flow | | |
| $L_{TSN4-1}, L_{TSN4-2} \ldots L_{TSN4-e}$ | Video data flow | | |
| $L_{TSN5-1}, L_{TSN5-2} \ldots L_{TSN5-f}$ | Voice data flow | | |
| $L_{TSN6-1}, L_{TSN6-2} \ldots L_{TSN6-g}$ | Internet control data flow | | |
| $L_{TSN7-1}, L_{TSN7-2} \ldots L_{TSN7-h}$ | Network control data flow | | |
| $L_{crossBE1}, L_{crossBE2} \ldots L_{crossBE\ a'}$ | | $BE_{cross}$ | |
| $L_{crossNRT1}, L_{crossNRT2} \ldots L_{crossNRT\ b'}$ | | $NRT_{cross}$ | |
| $L_{crossRT1}, L_{crossRT2} \ldots L_{crossRT\ c'}$ | | $RT_{cross}$ | |
| $L_{crossTC1}, L_{crossTC2} \ldots L_{crossTC\ d'}$ | | $TC_{cross}$ | |
| $L_{nonBE1}, L_{nonBE2} \ldots L_{nonBE\ a''}$ | | | $BE_{non}$ |
| $L_{nonNRT1}, L_{nonNRT2} \ldots L_{nonNRT\ b''}$ | | | $NRT_{non}$ |
| $L_{nonRT1}, L_{nonRT2} \ldots L_{nonRT\ c''}$ | | | $RT_{non}$ |
| $L_{nonTC1}, L_{nonTC2} \ldots L_{nonTCd''}$ | | | $TC_{non}$ |

In a third step, the TSSDN controller manages a scheduling priority of the data.

The data flows in S1{TSN←→TSN} are scheduled and managed by the TSN module in the TSSDN controller, and priorities of the data flows are determined according to IEEE802.1Q. A priority of the TSN data flow is indicated in a PCP field according to IEEE802.1Q. The TSN data flow has eight priorities: 0, 1, 2, 3, 4, 5, 6, and 7. OP represents a priority of a data flow in the S1{TSN←→TSN}.

For the S2{TSN←→non-TSN} and S3{TSN←→non-TSN}, delay level dl is used, that is, four delay levels are determined according to the delay requirements, and the delay levels correspond to data types one to one. Delay levels of TSN←→non-TSN links and non-TSN←→non-TSN links are represented by dl. A delay level dl of the best effort data flow is 1, a delay level dl of the non-real-time data is 2, a delay level dl of the real-time data is 3, and a delay level dl of the time-critical data is 4.

TABLE 2

Original priority and delay level in industrial heterogeneous network based on TSSDN

| Links | S1{TSN←→TSN} | S2{TSN←→non-TSN} | S3{non-TSN←→non-TSN} | OP | $dl_i$ |
|---|---|---|---|---|---|
| $L_{TSN1-1}, L_{TSN1-2} \ldots L_{TSN1-a}$ | Background data flow | | | 1 | |
| $L_{TSN0-1}, L_{TSN0-2} \ldots L_{TSN0-b}$ | Best effort data flow | | | 0 | |

TABLE 2-continued

Original priority and delay level in industrial heterogeneous network based on TSSDN

| Links | S1{TSN←→TSN} | S2{TSN←→non-TSN} | S3{non-TSN←→non-TSN} | OP | $dl_i$ |
|---|---|---|---|---|---|
| $L_{TSN2-1}, L_{TSN2-2} \ldots L_{TSN2-c}$ | Excellent effort data flow | | | 2 | |
| $L_{TSN3-1}, L_{TSN3-2} \ldots L_{TSN3-d}$ | Critical application data flow | | | 3 | |
| $L_{TSN4-1}, L_{TSN4-2} \ldots L_{TSN4-e}$ | Video data flow | | | 4 | |
| $L_{TSN5-1}, L_{TSN5-2} \ldots L_{TSN5-f}$ | Voice data flow | | | 5 | |
| $L_{TSN6-1}, L_{TSN6-2} \ldots L_{TSN6-g}$ | Internet control data flow | | | 6 | |
| $L_{TSN7-1}, L_{TSN7-2} \ldots L_{TSN7-h}$ | Network control data flow | | | 7 | |
| $L_{crossBE1}, L_{crossBE2} \ldots L_{crossBE\ a'}$ | | $BE_{cross}$ | | | 1 |
| $L_{crossNRT1}, L_{crossNRT2} \ldots L_{crossNRT\ b'}$ | | $NRT_{cross}$ | | | 2 |
| $L_{crossRT1}, L_{crossRT2} \ldots L_{crossRT\ c'}$ | | $RT_{cross}$ | | | 3 |
| $L_{crossTC1}, L_{crossTC2} \ldots L_{crossTC\ d'}$ | | $TC_{cross}$ | | | 4 |
| $L_{nonBE1}, L_{nonBE2} \ldots L_{nonBE\ a''}$ | | | $BE_{non}$ | | 1 |
| $L_{nonNRT1}, L_{nonNRT2} \ldots L_{nonNRT\ b''}$ | | | $NRT_{non}$ | | 2 |
| $L_{nonRT1}, L_{nonRT2} \ldots L_{nonRT\ c''}$ | | | $RT_{non}$ | | 3 |
| $L_{nonTC1}, L_{nonTC2} \ldots L_{nonTCd''}$ | | | $TC_{non}$ | | 4 |

Assuming that a scheduling priority reference coefficient $\Theta_i$ of a link i is expressed as the following equations:

$$\Theta_i = \begin{cases} \alpha * dl + \beta & Li \in S2\{TSN \leftarrow \rightarrow nonTSN\} \quad (4) \\ \alpha * dl & Li \in S3\{nonTSN \leftarrow \rightarrow nonTSN\} \quad (5) \end{cases}$$

where $\alpha$ represents a ration of dl to the scheduling priority reference coefficient $\Theta_i$, $\beta$ represent a ratio of OP to the scheduling priority reference coefficient $\Theta_i$, and $\alpha+\beta=1$. The TSSDN controller does not calculate scheduling priority reference coefficients of the data flows in the S1{TSN←→TSN}, calculates scheduling priority reference coefficients of the data flows in the S2{TSN←→non-TSN} based on equation (4), and calculates scheduling priority reference coefficients of the data flows in the S3{non-TSN←→non-TSN} based on equation (5).

$\alpha$ and $\beta$ may be adjusted according to low-latency requirements and real-time requirements for data in different application environments. In the present disclosure, requirements for low latency and accuracy of data are considered, it is assumed $\alpha$ is equal to 0.4 and $\beta$ is equal to 0.6, the scheduling priority of the heterogeneous network is shown in the following table 3, in which a lowest priority is 1 and a highest priority is 6.

TABLE 3

Relationship between scheduling priority reference coefficient and scheduling priority

| $\Theta i$ | Scheduling priority SP |
|---|---|
| $0 < \Theta i <= 0.5$ | 1 |
| $0.5 < \Theta i <= 1.0$ | 2 |
| $1 < \Theta i <= 1.3$ | 3 |
| $1.3 < \Theta i <= 1.6$ | 4 |
| $1.6 < \Theta i <= 1.9$ | 5 |
| $\Theta i > 1.9$ | 6 |

The priorities of the data flows in the S1{TSN←→TSN} are determined according to IEEE802.1Q, scheduling priorities of the data flows in the S2{TSN←→non-TSN} and S3{non-TSN←→non-TSN} are related to scheduling priority reference coefficients. The types and scheduling priorities of data flows in the industrial heterogeneous network based on TSSDN are shown in the following table 4.

TABLE 4

Scheduling priority

| Link L | S1{TSN←→TSN} | S2{TSN←→non-TSN} | S3{non-TSN←→non-TSN} | OP | dl | $\Theta_i$ | SP |
|---|---|---|---|---|---|---|---|
| $L_{TSN1-1}, L_{TSN1-2} \ldots L_{TSN1-a}$ | Background data flow | | | 1 | | | 1 |
| $L_{TSN0-1}, L_{TSN0-2} \ldots L_{TSN0-b}$ | Best effort data flow | | | 0 | | | 0 |
| $L_{TSN2-1}, L_{TSN2-2} \ldots L_{TSN2-c}$ | Excellent effort data flow | | | 2 | | | 2 |

TABLE 4-continued

Scheduling priority

| Link L | S1{TSN←→TSN} | S2{TSN←→non-TSN} | S3{non-TSN←→non-TSN} | OP | dl | $\Theta_i$ | SP |
|---|---|---|---|---|---|---|---|
| $L_{TSN3-1}, L_{TSN3-2} \cdots L_{TSN3-d}$ | Critical application data flow | | | 3 | | | 3 |
| $L_{TSN4-1}, L_{TSN4-2} \cdots L_{TSN4-e}$ | Video data flow | | | 4 | | | 4 |
| $L_{TSN5-1}, L_{TSN5-2} \cdots L_{TSN5-f}$ | Voice data flow | | | 5 | | | 5 |
| $L_{TSN6-1}, L_{TSN6-2} \cdots L_{TSN6-g}$ | Internet control data flow | | | 6 | | | 6 |
| $L_{TSN7-1}, L_{TSN7-2} \cdots L_{TSN7-h}$ | Network control data flow | | | 7 | | | 7 |
| $L_{crossBE1}, L_{crossBE2} \cdots L_{crossBE\ a'}$ | | $BE_{cross}$ | | 1 | 1 | | 2 |
| $L_{crossNRT1}, L_{crossNRT2} \cdots L_{crossNRTb'}$ | | $NRT_{cross}$ | | 2 | 1.4 | | 4 |
| $L_{crossRT1}, L_{crossRT2} \cdots L_{crossRT\ c'}$ | | $RT_{cross}$ | | 3 | 1.8 | | 5 |
| $L_{crossTC1}, L_{crossTC2} \cdots L_{crossTCd'}$ | | $TC_{cross}$ | | 4 | 2.2 | | 6 |
| $L_{nonBE1}, L_{nonBe2} \cdots L_{nonBE\ a''}$ | | | $BE_{non}$ | 1 | 0.4 | | 1 |
| $L_{nonNRT1}, L_{nonNRT2} \cdots L_{nonNRT\ b''}$ | | | $NRT_{non}$ | 2 | 0.8 | | 2 |
| $L_{nonRT1}, L_{nonRT2} \cdots L_{nonRT\ c''}$ | | | $RT_{non}$ | 3 | 1.2 | | 3 |
| $L_{nonTC1}, L_{nonTC2} \cdots L_{nonTC\ d''}$ | | | $TC_{non}$ | 4 | 1.6 | | 4 |

In a fourth step, the TSSDN controller calculates a shortest path.

After the TSSDN controller calculates a scheduling priority SP for a data flow, it is required to determine a path for the data flow. In selecting a route in a network, a Dijkstra algorithm may be used for selecting a route in a case of only considering the number of hops of the route. However, as the scale of the network continuously increases, more metric factors, such as constraints on bandwidth, delay, jitter, and packet loss rate, are required to be considered in selecting a route in a network. CSPF algorithm is a Dijkstra algorithm with constraints. In the present disclosure, an improved CSPF algorithm, that is, a multi-constrained and multi-objective routing algorithm is used to select an optimal path in the network to ensure efficient use of network resources under multiple constraints.

With the multi-constrained and multi-objective routing algorithm, an optimal path meeting multiple constraints is determined for a data flow in the network based on a network state and an application requirement. According to the present disclosure, the multiple constraints include bandwidth, delay, and jitter, and a route having a smallest delay and a largest available bandwidth is determined.

It is assumed that Path(p,q) represents the path from node p to node q, a link $L_1$ in the network meets Li∈Path(p,q), $d_i$, $j_i$, and $BD_i$ respectively represent the delay, jitter, and bandwidth of the link i. In a case that there is only one path from node p to node q, the only one path is a shortest path. In a case that there are multiple paths from node p to node q, a shortest path is calculated with the method according to the present disclosure. Constraint attributes of the path are expressed as the following equations:

$$d(\text{Path}(p,q)) = \Sigma_{Li \in Path(p,q)} d_i \quad (6)$$

$$j(\text{Path}(p,q)) = \Sigma_{Li \in Path(p,q)} j_i \quad (7)$$

$$BD(\text{Path}(p,q)) = \min\{BD_i, Li \in Path(p,q)\} \quad (8)$$

where d(Path(p,q)) represents a sum of delays of the path Path(p,q), j(Path(p,q)) represents a sum of jitters of the path Path(p,q), and BD(Path(p, q)) represents a minimum bandwidth of the path Path (p, q).

The multi-constrained and multi-objective routing algorithm according to the present disclosure is a multi-objective routing algorithm with a delay, a jitter and a bandwidth as constraints and with a minimum delay and a maximum available bandwidth as objectives, and is expressed as the following equation and inequalities:

$$\begin{cases} f(x) = (f1(x), f2(x)) \\ d(\text{Path}(p, q)) \le dc \\ j(\text{Path}(p, q)) \le jc \\ BD(\text{Path}(p, q)) \ge BDc \end{cases} \quad (9)$$

where an objective function F(x) is further expressed as:

$$\begin{cases} f1(x) = \min\{d(\text{Path}(p, q))\} \\ f2(x) = \max\{AvailableBD(\text{Path}(p, q))\} \end{cases} \quad (10)$$

where dc, jc, and BDc respectively represent a path delay constraint value, a path jitter constraint value, and a path bandwidth constraint value which are pre-determined by the user; min{D(Path(p,q))} represents a minimum delay from node p to node q, and max{AvailableBD(Path(p,q))} represents a maximum available bandwidth from node p to node q.

In the multi-constrained and multi-objective routing algorithm, a target route is determined based on a dictionary sorting algorithm. The dictionary sorting algorithm is an analytical algorithm for solving a multi-objective optimization problem, and a core idea of the dictionary sorting algorithm is that an importance of an objective function is indicated by a ranking of the objective functions. According to the algorithm in the present disclosure, the objective function $f1(x)$ is ranked before $f2(x)$, that is, a minimum delay is a primary objective in calculating a path, and if there are multiple paths having the minimum delay, a path having a largest available bandwidth is selected.

In a fifth step, the scheduling priority is marked.

To meet the qualities of service of data flows having different scheduling priorities, in the present disclosure, the TSSDN controller determines scheduling priorities of data flows from different field devices according. Eight scheduling priorities correspond to eight queues one to one, as shown in the following table 6:

TABLE 5

Mapping of scheduling priorities and queues

| Scheduling priority SP | Queue |
|---|---|
| 0 | 0 |
| 1 | 1 |
| 2 | 2 |
| 3 | 3 |
| 4 | 4 |
| 5 | 5 |
| 6 | 6 |
| 7 | 7 |

Each of data packets is scheduled based on a scheduling priority label of the data packet to control the data packet to arrive at the SDN switch in sequence. In a case that congestion occurs in the industrial heterogeneous network based on TSSDN due to that data flows having a scheduling priority increase suddenly, the TSSDN controller obtains network topology information, centrally controls the SDN switches to forward data flows in the industrial heterogeneous network, and transmits flow tables to perform bandwidth allocation and congestion control on data flows containing a large amount of data to improve network service quality, as shown in Table 5.

In a case that a data flow of a subnet of the heterogeneous network based on TSSDN arrives at a switch for a first time, the data flow is packaged as a PacketIn message and then is transmitted to the TSSDN controller due to that the switch does not includes a flow table matching the data flow. The TSSDN controller calculates a scheduling priority SP of the data flow with the method according to the present disclosure, and maps the scheduling priority SP to a priority code point (PCP). The TSSDN controller transmit a flow table indicating "marking a scheduling priority and forwarding to a destination port" to the switch. Then, for each of data flows having the scheduling priority arrives at the switch, a PCP field of the data flow indicates the scheduling priority, and the data flow is forwarded to an outgoing port corresponding to the destination port.

In a sixth step, SDN switch flow table matching is performed.

To improve accuracy of the TSSDN controller identifying the TSN data flow, the conventional flow table is modified according to the present disclosure, a matching field is extended, thus the SDN switch may match the TSN data packet accurately based on the extended matching field.

Protocol type is added in the matching field, where the protocol type indicates a network protocol, such as 802.1AS, 802.1Qbu, and 802.1Qbv, in the TSN network.

Source MAC address is added in the matching field, where the source MAC address indicates a MAC address of a source of the TSN data.

Destination MAC address is added in the matching field, where the destination MAC address indicates a MAC address of a destination of the TSN data.

To improve accuracy of the TSSDN controller identifying the TSN data flow, the conventional flow table is modified according to the present disclosure, a matching field is extended, thus the SDN switch may match the TSN data packet accurately based on the extended matching field.

Protocol type is added in the matching field, where the protocol type indicates a network protocol, such as 802.1AS, 802.1Qbu, and 802.1Qbv, in the TSN network.

Source MAC address is added in the matching field, where the source MAC address indicates a MAC address of a source of the TSN data.

Destination MAC address is added in the matching field, where the destination MAC address indicates a MAC address of a destination of the TSN data.

When a data flow arrives at the SDN switch, the SDN switch encapsulates data in the data flow as a PacketIn message and transmits the PacketIn message to the TSSDN controller. Based on a VLAN, a source MAC address and a destination MAC address in a matching field, the TSSDN controller transmits a TSN data flow to the TSN module and the TSN module schedules and manages the TSN data flow, and the TSSDN controller transmits a non-TSN data flow and a data flow of a TSN network cross a non-TSN network to a SDN module and the SDN module schedules and manages the non-TSN data flow and the data flow of the TSN network cross a non-TSN network. After the TSSDN controller performing a scheduling algorithm based on network traffic, the TSSDN controller determines to forward or discard a data flow based on a scheduling priority and bandwidth of the data flow arriving at the SDN switch, and transmits a flow table to the SDN switch. The SDN switch performs operations based on a matching result of the flow table in response to the decision of the TSSDN controller.

In a seventh step, it is determined whether a queue congestion occurs.

A current network environment may deteriorate due to an increase in the amount of data in forwarding data. Serious packet loss may occur if the amount of data to be forwarded is not adjusted in time, and some important and time-sensitive data may be lost and cannot be transmitted to certain receiving terminals. Thus, queues at a port are monitored in real time based on a feedback adjustment mechanism according to the present disclosure. When a network congestion occurs, adjustments are made based on the network congestion to prevent data retention caused by a queue congestion. Different adjustment strategies are provided for different levels of network congestion to avoid malicious packet loss in data forwarding. The level of the queue congestion is determined based on a queuing delay according to the present disclosure.

To accurately obtain a current network congestion, a random early detection (RED) algorithm is used to calculate an average length of a queue. $avgQ\_k$ represents an average length of a queue k. $q\_k$ represents a real-time length of the queue k and is calculated based on an enqueue rate and a dequeue rate of the queue k. w represents a weight, which is a time constant. Then, the average length of the queue is expressed as the following equation:

$$avgQk=(1-w)*avgQk+q*w \quad (7)$$

$$q\_k=\text{in\_rate}-\text{out\_rate} \quad (8)$$

In the random early detection algorithm, it is important to set a reasonable weight. Using a suitable w, the average queue length of the queue can be balanced, and the problem of average queue length jitter caused by a data surge or a short-term queue congestion can be avoided. With a too large w, the short-term queue congestion cannot be filtered out. With a too small w, the congestion cannot be reasonably reflected.

To calculate the queuing delay, it is required to obtain a current rate of the queue. The user sets a maximum bandwidth and a minimum bandwidth for each of the queues by using the application program in the terminal. If the maximum bandwidth is not equal to the minimum bandwidth, data is to be transmitted within a predetermined rate range; and if the maximum bandwidth is set equal to the minimum bandwidth, data in the queue is to be transmitted at a rate close to a predetermined rate. Thus, the current rate of the queue is obtained. The queuing delay is calculated based on the following equation:

$$\text{que\_dealy\_}k = \text{avg}Qk/\text{now\_rate\_}k \qquad (9)$$

where que_dealy_k represents a delay of the queue k, and now_rate_k represents a current rate of the queue k, that is, a current bandwidth of the queue.

In an eighth step, adjustment is performed based on a queue congestion feedback.

The optimization of data forwarding according to the present disclosure is provided for the queues at a port of the SDN switch. When the queue congestion occurs, the bandwidth of the queue is adjusted to a certain level based on the queue congestion. It is important to determine a level of a congestion in optimizing data forwarding. The level of the queue congestion is determined based on the queuing delay. Based on the data flows, the level of the queue congestion is determined as the normal state, the general congestion state, or the severe congestion state.

The queuing delay is compared with the maximum queue bandwidth, it is determined that the queue is in the normal state in a case that the queuing delay is less than 70% of the maximum queue bandwidth, it is determined that the queue is in the severe congestion state in a case that the queuing delay is greater than 90% of the maximum queue bandwidth, and it is determined that the queue is in the general congestion state in a case that the queuing delay is between 70% of the maximum queue bandwidth and 90% of the maximum queue bandwidth.

Based on a feedback adjustment mechanism, the queue bandwidth is adjusted based on a current priority and congestion of the queue. In a case of eight queues, a queue having a higher priority indicates that the queue has a stronger ability to preempt bandwidths of other queues in adjusting bandwidth, and a queue having a lower priority indicates that bandwidth of the queue is easier to be preempted and the queue has a worse ability to ensure QoS of a network.

Figure 7:
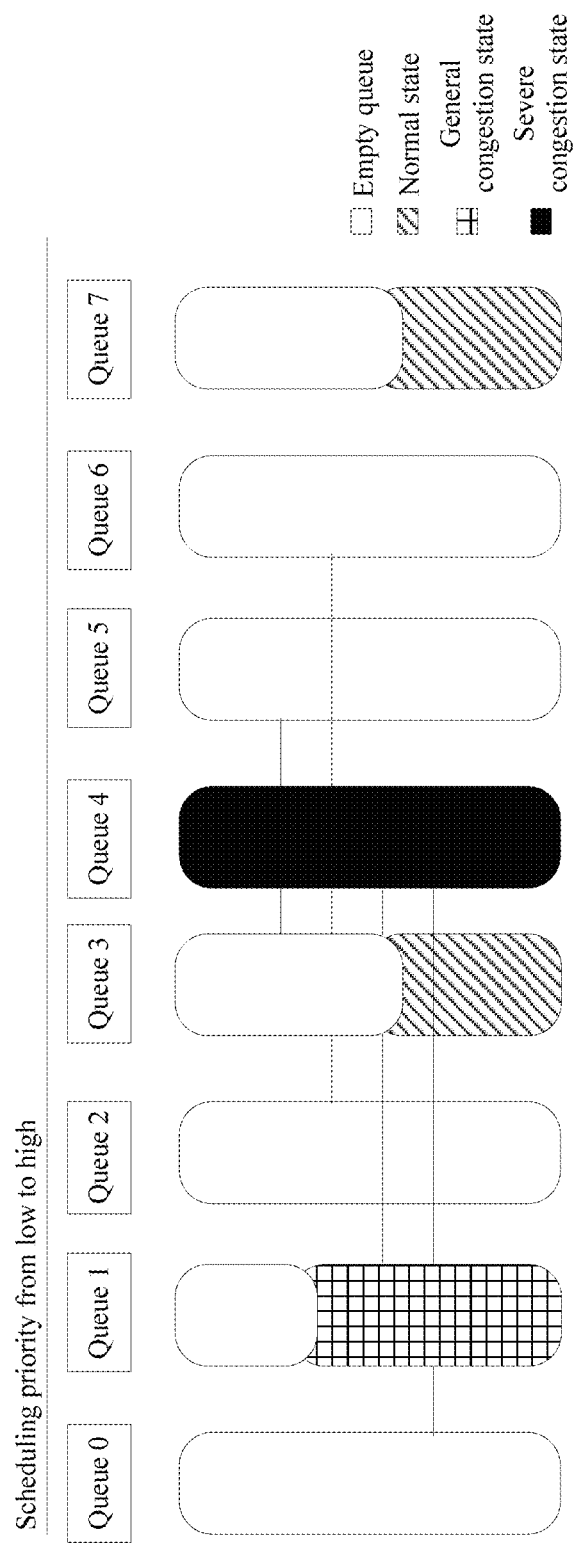
FIG. 7 is a schematic diagram of a queue preempting a bandwidth.

As shown in FIG. 7, a queue preempts bandwidth according to the following two rules. Rule (1), ensuring that a queue having a lower priority is not to enter into the severe congestion state in a case that a queue having a higher priority preempts bandwidth of the queue having the lower priority, and ensuring that a queue having a higher priority is in the normal state in a case that a queue having a lower priority preempts bandwidth of the queue having the higher priority. Rule (2), following a higher-first-lower-later rule in a case that queues having different priorities simultaneously preempt a bandwidth, that is, the queue having the higher priority preempts first, and then the queue having the lower priority preempts. Based on the rule (2), data having a high priority is to be transmitted first to ensure the time sensitivity of the data.

An Embodiment

Figure 8:
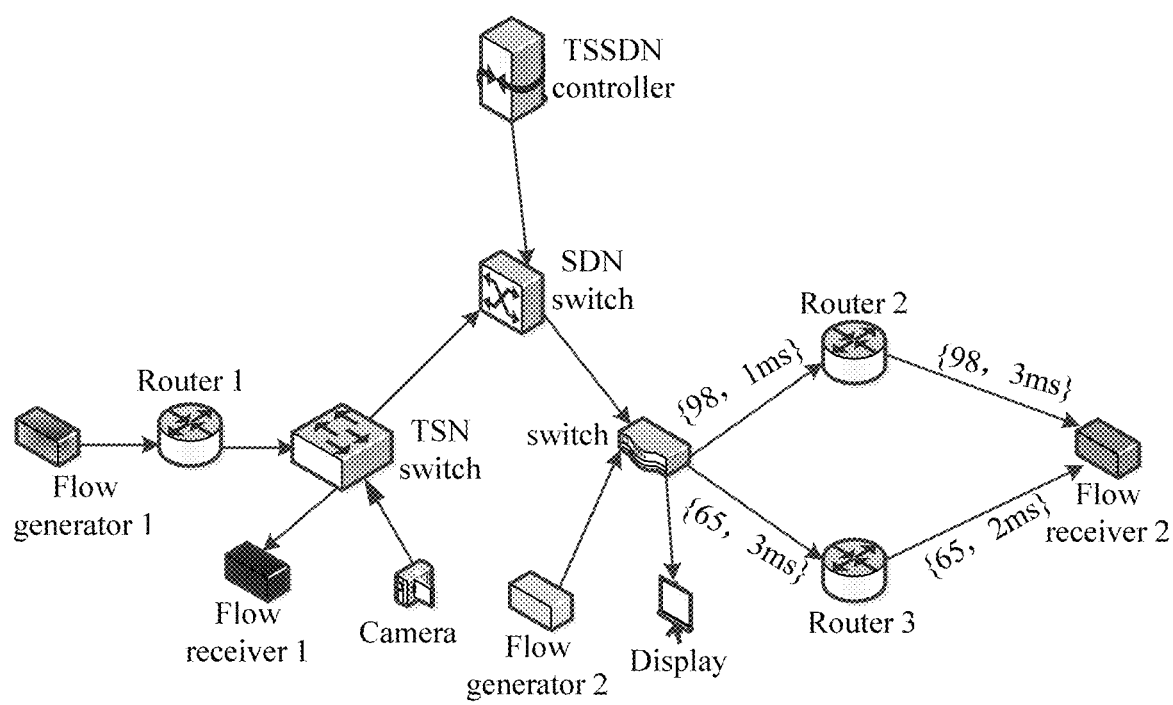
FIG. 8 is schematic structural diagram of an industrial heterogeneous network according to an embodiment of the present disclosure.

It is assumed there is an industrial heterogeneous network as shown in FIG. 8, then the data flows in the network are scheduled using the scheduling method based on routing in a heterogeneous network according to the present disclosure. A destination of a flow generator 1 is a flow generator 1, a destination of a camera is a display, and a destination of a flow generator 2 is a flow generator 2.

(1) The user uses the application program installed in the terminal to set a delay d1 of a link to 125 us and a priority of the link to 4, a delay d2 of a link to 58 ms and a priority of the link to 3, and a delay d3 of a link to 9 ms. For convenience of subsequent description, the three links are respectively represented by L1, L2, and L3.

(2) Data is classified.

(3) The TSSDN controller performs the second step of the method according to the present disclosure, L1 is included in S1{TSN←—→TSN}, L2 is included in S2{TSN←—→non-TSN}, L3 is included in S3{non-TSN←—→non-TSN}, and the data types of the links are show in the following table.

| Link | Data type |
|------|-----------|
| L1 | Video |
| L2 | Real-time data |
| L3 | Real-time data |

(4) Scheduling priorities are calculated.

According to the third step of the method, delay levels are determined. For L1, the L1 is a TSN link, and it is unnecessary to determine delay level. For L2, data type is real-time data, and delay level is 3. For L3, data type is real-time data, and delay level is 3.

| Link | Data type | Original priority | Delay level |
|------|-----------|-------------------|-------------|
| L1 | Video | 4 | |
| L2 | Real-time data | | 3 |
| L3 | Real-time data | | 3 |

According to the third step of the method, the priorities of the links are managed. For L1, the priority is 4, and the TSN module in the TSSDN controller schedules and manage L1. For L2, the priority is 5, which is calculated based on the equation (4) of $\Theta_2 = 0.4*3+0.6 = 1.8$. For L3, the priority is 3, which is calculated based on the formula (5) of $\Theta_4 = 0.4*3 = 1.2$.

| Link | Data type | Original priority | Delay level | scheduling priority |
|------|-----------|-------------------|-------------|---------------------|
| L1 | Video | 4 | | |
| L2 | Real-time data | | 3 | 5 |
| L3 | Real-time data | | 3 | 3 |

(4) A flow table is generated.

For L1, there is only one path, it is unnecessary to calculate a shortest path, and the only one path is the shortest path. For L2, there is only one path, it is unnecessary to calculate a shortest path, and the only one path is the shortest path. For L3, there are multiple paths, it is required to calculate a shortest path from the flow generator 2 to the flow receiver 2.

| Path name | Path | Delay | Jitter | Bandwidth |
|-----------|------|-------|--------|-----------|
| Path1 | flow generator 2→switch→router 2→flow receiver 2 | 4 ms | 1 | 98 Mbps |

-continued

| Path name | Path | Delay | Jitter | Bandwidth |
|---|---|---|---|---|
| Path2 | flow generator 2→switch→router 3→ flow receiver 2 | 5 ms | 2 | 65 Mbps |

According to the shortest path algorithm in the present disclosure, the delay, as a constraint, is an important reference, thus the TSSDN controller selects Path1 as a transmission path for the flow generator 2.

(5) The scheduling priority is marked.

Scheduling priorities correspond to queues one to one.

| Scheduling priority SP | Queue |
|---|---|
| 3 | 3 |
| 4 | 4 |
| 5 | 5 |

In a case that a data flow of a subnet of the heterogeneous network based on TSSDN arrives at a switch for a first time, the data flow is packaged as a PacketIn message and then is transmitted to the TSSDN controller due to that the switch does not includes a flow entry matching the data flow. The TSSDN controller maps the scheduling priority SP to a priority code point (PCP). The TSSDN controller transmit a flow entry of "marking a scheduling priority and forwarding to a destination port" to the switch. Then, for each of data flows arriving at the switch, a PCP field of the data flow is marked with a scheduling priority, and the data flow is forwarded to an outgoing port corresponding to the destination port.

(6) A flow table is generated.

The TSSDN controller generates a flow table and transmits the flow table to the SDN switch. When a data flow arrives at the SDN switch, flow table matching is performed.

Finally, it should be noted that the embodiments described above are only provided for describing the technical solutions of the present disclosure rather than limiting the technical solutions. Although the present disclosure is described in detail with reference to the preferred embodiments described above, those skilled in the art should understand that modifications or substitutions may be made to the technical solutions of the present disclosure without departing from the spirit and scope of the present disclosure. The modification or substitutions should fall within the scope of the claims of the present disclosure.

The invention claimed is:

1. A scheduling method applied in an industrial heterogeneous network in which a time sensitive networking (TSN) and a non-TSN are interconnected, wherein
the industrial heterogeneous network based on time sensitive software defined networking (TSSDN) comprises an application plane, a control plane, and a forwarding plane;
the application plane comprises a user and a terminal installed with an application program for controlling a TSSDN controller, wherein the application program installed in the terminal is used by the user to configure the TSSDN controller according to an application requirement of the user;
the control plane comprises the TSSDN controller, wherein the TSSDN controller identifies a network topology, determines a scheduling strategy, performs path management, and the TSSDN controller schedules a data flow in the industrial heterogeneous network based on an application request from an application layer;
the forwarding plane comprises an industrial network and a TSN network, wherein the industrial network comprises at least one network based on an industrial network protocol of EtherCAT, Profinet, or powerlink, and the industrial heterogeneous network comprises a non-TSN industrial network, a TSN industrial network, and a TSN industrial network cross a non-TSN network, which are classified according to whether the data flow transmitted in the industrial heterogeneous network is a TSN data flow; and the forwarding plane comprises a software defined networking (SDN) switch, a TSN switch, an industrial switch, an industrial field device, and a TSN field device, wherein the SDN switch, the TSN switch and industrial switch perform data forwarding, the industrial field device transmits and receives data in the industrial network, and the TSN field device comprises a TSN talker and a TSN listener, wherein the TSN talker transmits data, and TSN listener receives data;
wherein the TSSDN controller is a core of the industrial heterogeneous network and has a function of performing centralized management and control, the TSSDN controller comprises a path manager, a topology manager, and a strategy manager, and the TSSDN controller schedules the data flow in the industrial heterogeneous network based on the application request from the application layer;
the topology manager identifies the network topology, updates the network topology, and feeds the network topology back to the application program installed in the terminal;
the path manager performs a plurality of path management operations, comprising setting a link delay and setting a queue bandwidth, in response to the application requirement of the user; and
the strategy manager comprises a TSN manager and an SDN manager, and performs strategy management to meet a delay requirement of a time sensitive application in the industrial heterogeneous network, wherein
a centralized user configuration (CUC)/centralized network configuration (CNC) in the TSN manager performs centralized management on the TSN industrial network, and the CNC performs a centralized calculation comprising calculating transmission scheduling, determining a data path, and scheduling the TSN data flow based on a time-aware shaper and a frame preemption scheduling algorithm; and
an SDN controller in the SDN manager performs centralized management on the non-TSN industrial network and the TSN industrial network cross a non-TSN network, and schedules the non-TSN industrial network and the TSN industrial network cross a non-TSN network by transmitting a flow table to the SDN switch;
wherein the scheduling method applied in an industrial heterogeneous network in which a TSN and a non-TSN are interconnected comprises the following steps:
step S1: configuring and managing, by the user, the TSSDN controller according to the application requirement by using the application program installed in the terminal in a network deployment phase;
step S2: classifying, by the TSSDN controller, data according to the delay requirement;

step S3: managing, by the TSSDN controller, a scheduling priority of the data;

step S4: calculating, by the TSSDN controller, a shortest path;

step S5: marking the scheduling priority;

step S6: performing flow table matching at the SDN switch, wherein the SDN switch comprises one or more flow tables, the flow table matching is started from a first flow table in the flow tables in sequence, in a case that data is matched with a flow entry in a flow table, a counter is updated and an instruction comprised in the flow table is executed, wherein the instruction comprises a forwarding instruction or a discarding instruction; and in a case that the flow table matching is performed unsuccessfully, a PacketIn message is transmitted to the TSSDN controller, and the TSSDN controller performs analysis and makes a decision;

step S7: determining whether a queue congestion occurs, wherein queues at a port are monitored in real time based on a feedback adjustment mechanism; when a network congestion occurs, adjustment is performed based on the network congestion to prevent data retention caused by a queue congestion; different adjustments are performed for different levels of network congestion; and a level of the queue congestion is determined based on a queuing delay; and step S8: performing adjustment based on a queue congestion feedback, wherein when the queue congestion occurs, a bandwidth of the queue is adjusted based on the level of the queue congestion; the level of the queue congestion is determined based on the queuing delay; based on traffic, the level of the queue congestion is determined as a normal state, a general congestion state, or a severe congestion state; the queuing delay is compared with a maximum queue bandwidth, it is determined that the queue is in the normal state in a case that the queuing delay is less than 70% of the maximum queue bandwidth, it is determined that the queue is in the severe congestion state in a case that the queuing delay is greater than 90% of the maximum queue bandwidth, and it is determined that the queue is in the general congestion state in a case that the queuing delay is between 70% of the maximum queue bandwidth and 90% of the maximum queue bandwidth.

2. The scheduling method applied in an industrial heterogeneous network in which a TSN and a non-TSN are interconnected according to claim 1, wherein in step S1, the user performs topology information management and flow information management according to the application requirement of the user by using the application program installed in the terminal, the flow information management comprises setting the link delay, setting the maximum queue bandwidth and a minimum queue bandwidth, and determining current data forwarding in the network, the user configures the link delay and a link bandwidth according to the application requirement, and after the user performs the configuration successfully, six sets are generated, wherein the six sets comprise a link set, a delay requirement set for each of links, a jitter requirement set for each of the links, a bandwidth set for each of the links, a path constraint set determined by the user, and a bandwidth set for each of queues:

a link set $\{L_1 \ldots L_i \ldots\}$;

a delay requirement set for each of links $\{d_1 \ldots d_i \ldots\}$;

a jitter requirement set for each of the links $\{j_1 \ldots j_i \ldots\}$;

a bandwidth set for each of the links $\{BD_1 \ldots BD_i \ldots\}$;

a path constraint set determined by the user $\{d_c, j_c, BD_c\}$; and a maximum bandwidth and minimum bandwidth set for a queue k $\{max\_bw\_k, min\_bw\_k\}$.

3. The scheduling method applied in an industrial heterogeneous network in which a TSN and a non-TSN are interconnected according to claim 2, wherein in step S2, it is assumed that Path(p,q) represents a path from node p to node q, a link $L_i$ in the network meets an expression of $L_i \in Path(p,q)$, $d_i$, $j_i$, and $BD_i$ respectively represent a delay, a jitter and a bandwidth of the link i, dl represents a delay level, OP represents a priority of data in the TSN network, α represents a ratio of dl to a scheduling priority reference coefficient $\Theta_i$, β represent a ratio of OP to the scheduling priority reference coefficient $\Theta_i$;

the TSSDN controller classifies links into the following three types according to distributions of TSN nodes and non-TSN nodes:

links between the TSN nodes and the TSN nodes, comprised in a set S1{TSN←→TSN};

links between the TSN nodes and the non-TSN nodes, comprised in a set S2{TSN←→non-TSN}; and links between the non-TSN nodes and the non-TSN nodes, comprised in a set S3{TSN←→non-TSN};

for S1{TSN←→TSN}, data flows are classified according to IEEE 802.1Q into eight types: a background data flow, a best effort data flow, an excellent effort data flow, a critical application data flow, a video data flow, a voice data flow, an internet control data flow, and a network control data flow;

for S2{TSN←→non-TSN} and S3{non-TSN←→non-TSN}, the TSSDN controller classifies data flows in the industrial heterogeneous network according to delay requirements of the links by performing comparison and calculation based on the following inequalities (1), (2), and (3), a data flow having a delay requirement meeting inequality (1) is determined as non-real-time data NRT, a data flow having a delay requirement meeting inequality (2) is determined as real-time data RT, a data flow having a delay requirement meeting inequality (3) is determined as time-critical data TC, and a data flow having no delay requirement is determined as a best-effort BE data flow;

$$d_i \geq 100 \text{ ms} \tag{1}$$

$$1 \text{ ms} < d_i < 100 \text{ ms} \tag{2}$$

$$d_i < 1 \text{ ms} \tag{3}$$

for S2{TSN←→non-TSN}, data flows are classified into four types: time-critical data, real-time data, non-real-time data, and a best-effort data flow, which are respectively represented by $TC_{cross}$, $RT_{cross}$, $NRT_{cross}$, and $BE_{cross}$;

for S3{non-TSN←→non-TSN}, data flows are classified into four types: time-critical data, real-time data, non-real-time data, and best-effort data flow, which are respectively represented by $TC_{non}$, $RT_{non}$, $NRT_{non}$, and $BE_{non}$;

the industrial heterogeneous network based on TSSDN comprises a plurality of links, the links are classified into three sets S1{TSN←→TSN}, S2{TSN←→non-TSN}, and S3{non-TSN←→non-TSN} based on the distributions of the TSN nodes and the non-TSN nodes, for each of the three sets, data flows are further classified into a plurality of types according to the delay requirements, and the classification of the data flows are shown in the following table:

| Links | S1{TSN←→TSN} | S2{TSN←→non-TSN} | S3{non-TSN←→non-TSN} |
|---|---|---|---|
| $L_{TSN1-1}, L_{TSN1-2} \cdots L_{TSN1-a}$ | Background data flow | | |
| $L_{TSN0-1}, L_{TSN0-2} \cdots L_{TSN0-b}$ | Best effort data flow | | |
| $L_{TSN2-1}, L_{TSN2-2} \cdots L_{TSN2-c}$ | Excellent effort data flow | | |
| $L_{TSN3-1}, L_{TSN3-2} \cdots L_{TSN3-d}$ | Critical application data flow | | |
| $L_{TSN4-1}, L_{TSN4-2} \cdots L_{TSN4-e}$ | Video data flow | | |
| $L_{TSN5-1}, L_{TSN5-2} \cdots L_{TSN5-f}$ | Voice data flow | | |
| $L_{TSN6-1}, L_{TSN6-2} \cdots L_{TSN6-g}$ | Internet control data flow | | |
| $L_{TSN7-1}, L_{TSN7-2} \cdots L_{TSN7-h}$ | Network control data flow | | |
| $L_{crossBE1}, L_{crossBE2} \cdots L_{crossBE\ a'}$ | | $BE_{cross}$ | |
| $L_{crossNRT1}, L_{crossNRT2} \cdots L_{crossNRT\ b'}$ | | $NRT_{cross}$ | |
| $L_{crossRT1}, L_{crossRT2} \cdots L_{crossRT\ c'}$ | | $RT_{cross}$ | |
| $L_{crossTC1}, L_{crossTC2} \cdots L_{crossTC\ d'}$ | | $TC_{cross}$ | |
| $L_{nonBE1}, L_{nonBE2} \cdots L_{nonBE\ a''}$ | | | $BE_{non}$ |
| $L_{nonNRT1}, L_{nonNRT2} \cdots L_{nonNRT\ b''}$ | | | $NRT_{non}$ |
| $L_{nonRT1}, L_{nonRT2} \cdots L_{nonRT\ c''}$ | | | $RT_{non}$ |
| $L_{nonTC1}, L_{nonTC2} \cdots L_{nonTCd''}$ | | | $TC_{non}$ |

4. The scheduling method applied in an industrial heterogeneous network in which a TSN and a non-TSN are interconnected according to claim 3, wherein in step S3,
data flows in S1{TSN←→TSN} are scheduled and managed by the TSN manager in the TSSDN controller, and priorities of the data flows are determined according to IEEE802.1Q; a priority of the TSN data flow is indicated in a PCP field according to IEEE802.1Q, and the TSN data flow has eight priorities: 0, 1, 2, 3, 4, 5, 6, and 7; OP represents a priority of a data flow in the S1{TSN←→TSN};

for the S2{TSN←→non-TSN} and S3{TSN←→non-TSN}, delay level dl is used, that is, four delay levels are determined according to the delay requirements, and the delay levels correspond to data types one to one; delay levels of TSN←→non-TSN links and non-TSN←→non-TSN links are represented by dl; a delay level dl of the best effort data flow is 1, a delay level dl of the non-real-time data is 2, a delay level dl of the real-time data is 3, and a delay level dl of time-critical data is 4, as shown in the following table:

| Links | S1{TSN←→TSN} | S2{TSN←→non-TSN} | S3{non-TSN←→non-TSN} | OP | $dl_i$ |
|---|---|---|---|---|---|
| $L_{TSN1-1}, L_{TSN1-2} \cdots L_{TSN1-a}$ | Background data flow | | | 1 | |
| $L_{TSN0-1}, L_{TSN0-2} \cdots L_{TSN0-b}$ | Best effort data flow | | | 0 | |
| $L_{TSN2-1}, L_{TSN2-2} \cdots L_{TSN2-c}$ | Excellent effort data flow | | | 2 | |
| $L_{TSN3-1}, L_{TSN3-2} \cdots L_{TSN3-d}$ | Critical application data flow | | | 3 | |
| $L_{TSN4-1}, L_{TSN4-2} \cdots L_{TSN4-e}$ | Video data flow | | | 4 | |
| $L_{TSN5-1}, L_{TSN5-2} \cdots L_{TSN5-f}$ | Voice data flow | | | 5 | |
| $L_{TSN6-1}, L_{TSN6-2} \cdots L_{TSN6-g}$ | Internet control data flow | | | 6 | |
| $L_{TSN7-1}, L_{TSN7-2} \cdots L_{TSN7-h}$ | Network control data flow | | | 7 | |
| $L_{crossBE1}, L_{crossBE2} \cdots L_{crossBE\ a'}$ | | $BE_{cross}$ | | | 1 |
| $L_{crossNRT1}, L_{crossNRT2} \cdots L_{crossNRT\ b'}$ | | $NRT_{cross}$ | | | 2 |

-continued

| Links | S1{TSN←→TSN} | S2{TSN←→non-TSN} | S3{non-TSN←→non-TSN} | OP | $dl_i$ |
|---|---|---|---|---|---|
| $L_{crossRT1}, L_{crossRT2} \cdots L_{crossRT\ c'}$ | | $RT_{cross}$ | | | 3 |
| $L_{crossTC1}, L_{crossTC2} \cdots L_{crossTC\ d'}$ | | $TC_{cross}$ | | | 4 |
| $L_{nonBE1}, L_{nonBE2} \cdots L_{nonBE\ a''}$ | | | $BE_{non}$ | | 1 |
| $L_{nonNRT1}, L_{nonNRT2} \cdots L_{nonNRT\ b''}$ | | | $NRT_{non}$ | | 2 |
| $L_{nonRT1}, L_{nonRT2} \cdots L_{nonRT\ c''}$ | | | $RE_{non}$ | | 3 |
| $L_{nonTC1}, L_{nonTC2} \cdots L_{nonTCd''}$ | | | $TC_{non}$ | | 4 | assuming that a scheduling priority reference coefficient $\Theta_i$ of a link i is expressed as the following equations:

$$\Theta_i = \begin{cases} \alpha * dl + \beta & Li \in S2\{TSN \leftarrow \rightarrow nonTSN\} \quad (4) \\ \alpha * dl & Li \in S3\{nonTSN \leftarrow \rightarrow nonTSN\} \quad (5) \end{cases}$$

where α represents a ration of dl to the scheduling priority reference coefficient $\Theta_i$, β represent a ratio of OP to the scheduling priority reference coefficient $\Theta_i$, and α+β=1;

the TSSDN controller does not calculate scheduling priority reference coefficients of the data flows in the S1{TSN←→TSN}, calculates scheduling priority reference coefficients of data flows in the S2{TSN←→non-TSN} based on equation (4), and calculates scheduling priority reference coefficients of data flows in the S3{non-TSN←→non-TSN} based on equation (5);

α and β are adjusted according to low-latency requirements and real-time requirements for data in different application environments; and it is assumed that α is equal to 0.4 and β is equal to 0.6, the scheduling priority of the heterogeneous network is shown in the following table, in which a lowest priority is 1 and a highest priority is 6;

| Θi | Scheduling priority SP |
|---|---|
| 0 < Θi <= 0.5 | 1 |
| 0.5 < Θi <= 1.0 | 2 |
| 1 < Θi <= 1.3 | 3 |
| 1.3 < Θi <= 1.6 | 4 |
| 1.6 < Θi <= 1.9 | 5 |
| Θi > 1.9 | 6 | the priorities of the data flows in the S1{TSN←→TSN} are determined according to IEEE802.1Q, scheduling priorities of the data flows in the S2 {TSN←→non-TSN} and S3{non-TSN←→non-TSN} are related to scheduling priority reference coefficients, and the types and scheduling priorities of the data flows in the industrial heterogeneous network based on TSSDN are shown in the following table:

| Link L | S1{TSN←→TSN} | S2{TSN←→non-TSN} | S3{non-TSN←→non-TSN} | OP | dl | $\Theta_i$ | SP |
|---|---|---|---|---|---|---|---|
| $L_{TSN1-1}, L_{TSN1-2} \cdots L_{TSN1-a}$ | Background data flow | | | 1 | | | 1 |
| $L_{TSN0-1}, L_{TSN0-2} \cdots L_{TSN0-b}$ | Best effort data flow | | | 0 | | | 0 |
| $L_{TSN2-1}, L_{TSN2-2} \cdots L_{TSN2-c}$ | Excellent effort data flow | | | 2 | | | 2 |
| $L_{TSN3-1}, L_{TSN3-2} \cdots L_{TSN3-d}$ | Critical application data flow | | | 3 | | | 3 |
| $L_{TSN4-1}, L_{TSN4-2} \cdots L_{TSN4-e}$ | Video data flow | | | 4 | | | 4 |
| $L_{TSN5-1}, L_{TSN5-2} \cdots L_{TSN5-f}$ | Voice data flow | | | 5 | | | 5 |
| $L_{TSN6-1}, L_{TSN6-2} \cdots L_{TSN6-g}$ | Internet control data flow | | | 6 | | | 6 |
| $L_{TSN7-1}, L_{TSN7-2} \cdots L_{TSN7-h}$ | Network control data flow | | | 7 | | | 7 |
| $L_{crossBE1}, L_{crossBE2} \cdots L_{crossBE\ a'}$ | | $BE_{cross}$ | | 1 | 1 | | 2 |
| $L_{crossNRT1}, L_{crossNRT2} \cdots L_{crossNRTb'}$ | | $NRT_{cross}$ | | 2 | 1.4 | | 4 |
| $L_{crossRT1}, L_{crossRT2} \cdots L_{crossRT\ c'}$ | | $RT_{cross}$ | | 3 | 1.8 | | 5 |
| $L_{crossTC1}, L_{crossTC2} \cdots L_{crossTCd'}$ | | $TC_{cross}$ | | 4 | 2.2 | | 6 |
| $L_{nonBE1}, L_{nonBE2} \cdots L_{nonBE\ a''}$ | | | $BE_{non}$ | 1 | 0.4 | | 1 |
| $L_{nonNRT1}, L_{nonNRT2} \cdots L_{nonNRT\ b''}$ | | | $NRT_{non}$ | 2 | 0.8 | | 2 |
| $L_{nonRT1}, L_{nonRT2} \cdots L_{nonRT\ c''}$ | | | $RT_{non}$ | 3 | 1.2 | | 3 |
| $L_{nonTC1}, L_{nonTC2} \cdots L_{nonTC\ d''}$ | | | $TC_{non}$ | 4 | 1.6 | | 4 |

5. The scheduling method applied in an industrial heterogeneous network in which a TSN and a non-TSN are interconnected according to claim 4, wherein in step S4,
   after calculating a scheduling priority SP of a data flow, the TSSDN controller determines a path for the data flow, wherein an improved CSPF algorithm, that is, a multi-constrained and multi-objective routing algorithm, is used to select an optimal path in the network, and with the multi-constrained and multi-objective routing algorithm, an optimal path meeting a plurality of constraints is determined for the data flow in the network based on a network state and an application requirement;
   it is assumed that Path(p,q) represents the path from node p to node q, a link $L_i$ in the network meets $Li \in Path(p,q)$, $d_i$, $j_i$, and $BD_i$ respectively represent the delay, jitter, and bandwidth of the link i; in a case that there is only one path from node p to node q, the only one path is a shortest path; in a case that there are a plurality of paths from node p to node q, a shortest path is calculated; and constraint attributes of the path are expressed as the following equations:

$$d(Path(p,q)) = \Sigma_{Li \in Path(p,q)} d_i \qquad (6)$$

$$j(Path(p,q)) = \Sigma_{Li \in Path(p,q)} j_i \qquad (7)$$

$$BD(Path(p,q)) = \min\{BD_i, Li \in Path(p,q)\} \qquad (8)$$

where d(Path(p,q)) represents a sum of delays of the path Path(p,q), j(Path(p,q)) represents a sum of jitters of the path Path(p,q), and BD(Path(p, q)) represents a minimum bandwidth of the path Path (p, q);
the multi-constrained and multi-objective routing algorithm is a multi-objective routing algorithm with a delay, a jitter and a bandwidth as constraints and with a minimum delay and a maximum available bandwidth as objectives, and is expressed as the following equation and inequalities:

$$\begin{cases} f(x) = (f1(x), f2(x)) \\ d(Path(p, q)) \le dc \\ j(Path(p, q)) \le jc \\ BD(Path(p, q)) \ge BDc \end{cases} \qquad (9)$$

where an objective function F(x) is further expressed as:

$$\begin{cases} f1(x) = \min\{d(Path(p, q))\} \\ f2(x) = \max\{AvailableBD(Path(p, q))\} \end{cases} \qquad (10)$$

where dc, jc, and BDc respectively represent a path delay constraint value, a path jitter constraint value, and a path bandwidth constraint value which are pre-determined by the user; min {D(Path(p,q))} represents a minimum delay from node p to node q, and max {AvailableBD(Path(p,q))} represents a maximum available bandwidth from node p to node q;
in the multi-constrained and multi-objective routing algorithm, a target route is determined based on a dictionary sorting algorithm, wherein the dictionary sorting algorithm is an analytical algorithm for solving a multi-objective optimization problem, and a core idea of the dictionary sorting algorithm is that an importance of an objective function is indicated by a ranking of the objective functions; the objective function $f1(x)$ is ranked before $f2(x)$, that is, a minimum delay is a primary objective in calculating a path, and if there are a plurality of paths having the minimum delay, a path having a largest available bandwidth is selected.

6. The scheduling method applied in an industrial heterogeneous network in which a TSN and a non-TSN are interconnected according to claim 5, wherein
   in step S5,
      the TSSDN controller determines scheduling priorities of data flows from different field devices, and eight scheduling priorities respectively correspond to eight queues as shown in the following table:

| Scheduling priority SP | Queue |
| --- | --- |
| 0 | 0 |
| 1 | 1 |
| 2 | 2 |
| 3 | 3 |
| 4 | 4 |
| 5 | 5 |
| 6 | 6 |
| 7 | 7 | each of data packets is scheduled based on a scheduling priority label of the data packet to control the data packet to arrive at the SDN switch in sequence; in a case that congestion occurs in the industrial heterogeneous network based on TSSDN due to that data flows having a scheduling priority increase suddenly, the TSSDN controller obtains network topology information, centrally controls the SDN switches to forward data flows in the industrial heterogeneous network, and transmits flow tables to perform bandwidth allocation and congestion control on data flows containing a large amount of data to improve network service quality;
in a case that a data flow of a subnet of the heterogeneous network based on TSSDN arrives at a switch for a first time, the data flow is packaged as a PacketIn message and then is transmitted to the TSSDN controller due to that the switch does not comprise a flow entry matching the data flow, the TSSDN controller calculates a scheduling priority SP of the data flow and maps the scheduling priority SP to a priority code point PCP, the TSSDN controller transmits a flow entry of "marking a scheduling priority and forwarding to a destination port" to the switch; then, for each of data flows arriving at the switch, a PCP field of the data flow is marked with a scheduling priority, and the data flow is forwarded to an outgoing port corresponding to the destination port.

7. The scheduling method applied in an industrial heterogeneous network in which a TSN and a non-TSN are interconnected according to claim 6, wherein
   in step S6,
      to improve accuracy of the TSSDN controller identifying the TSN data flow, a matching field is extended wherein the SDN switch matches the TSN data packet accurately based on the extended matching field;
      protocol type is added in the matching field, wherein the protocol type indicates a network protocol, such as 802.1AS, 802.1Qbu, and 802.1Qbv, in the TSN network;

source MAC address is added in the matching field, wherein the source MAC address indicates a MAC address of a source of the TSN data;

destination MAC address is added in the matching field, wherein the destination MAC address indicates a MAC address of a destination of the TSN data;

when a data flow arrives at the SDN switch, the SDN switch encapsulates data in the data flow as a PacketIn message and transmits the PacketIn message to the TSSDN controller; based on a VLAN, a source MAC address and a destination MAC address in a matching field, the TSSDN controller transmits a TSN data flow to a TSN manager and the TSN manager schedules and manages the TSN data flow, the TSSDN controller transmits a non-TSN data flow and a data flow of a TSN network cross a non-TSN network to a SDN manager and the SDN manager schedules and manages the non-TSN data flow and the data flow of the TSN network cross a non-TSN network; after the TSSDN controller performing a scheduling algorithm based on network traffic, the TSSDN controller determines to forward or discard a data flow based on a scheduling priority and bandwidth of the data flow arriving at the SDN switch, and transmits a flow table to the SDN switch; and the SDN switch performs operations based on a matching result of the flow table in response to the decision of the TSSDN controller.

8. The scheduling method applied in an industrial heterogeneous network in which a TSN and a non-TSN are interconnected according to claim 7, wherein in step S8, when the queue congestion occurs, the bandwidth of the queue is adjusted to a certain level based on the queue congestion; the level of the queue congestion is determined based on the queuing delay; based on the data flows, the level of the queue congestion comprises the normal state, the general congestion state, or the severe congestion state, which is shown in the following table:

| Relationship between queuing delay and maximum bandwidth | Congestion level |
|---|---|
| que_dealy < 70% max_bd | Normal state |
| 70% < que_dealy < 90% max_bd | General congestion state |
| que_dealy > 90% max_bd | Severe congestion state | the queuing delay is compared with the maximum queue bandwidth, it is determined that the queue is in the normal state in a case that the queuing delay is less than 70% of the maximum queue bandwidth, it is determined that the queue is in the severe congestion state in a case that the queuing delay is greater than 90% of the maximum queue bandwidth, and it is determined that the queue is in the general congestion state in a case that the queuing delay is between 70% of the maximum queue bandwidth and 90% of the maximum queue bandwidth;

based on a feedback adjustment mechanism, the queue bandwidth is adjusted based on a current priority and congestion of the queue; in a case of six queues, a queue having a higher priority indicates that the queue has a stronger ability to preempt bandwidth of other queues in adjusting bandwidth, and a queue having a lower priority indicates that bandwidth of the queue is easier to be preempted and the queue has a worse ability to ensure QoS of a network; and a queue preempts bandwidth according to the following rules:

rule (1), ensuring that a queue having a lower priority is not to enter into the severe congestion state in a case that a queue having a higher priority preempts bandwidth of the queue having the lower priority, and ensuring that a queue having a higher priority is in the normal state in a case that a queue having a lower priority preempts bandwidth of the queue having the higher priority, and rule (2), following a higher-first-lower-later rule in a case that queues having different priorities simultaneously preempt a bandwidth, that is, the queue having the higher priority preempts first, and then the queue having the lower priority preempts.

* * * * *